US008488671B2

(12) United States Patent
Etoh et al.

(10) Patent No.: US 8,488,671 B2
(45) Date of Patent: Jul. 16, 2013

(54) MOVING PICTURE ENCODING DEVICE, MOVING PICTURE DECODING DEVICE, MOVING PICTURE ENCODING METHOD, MOVING PICTURE DECODING METHOD, PROGRAM, AND COMPUTER READABLE RECORDING MEDIUM STORING PROGRAM

(75) Inventors: Minoru Etoh, Yokohama (JP); Satoru Adachi, Yokohama (JP); Mitsuru Kobayashi, Yokohama (JP); Sadaatsu Kato, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 240 days.

(21) Appl. No.: 12/034,159

(22) Filed: Feb. 20, 2008

(65) Prior Publication Data

US 2008/0144714 A1 Jun. 19, 2008

Related U.S. Application Data

(62) Division of application No. 10/496,017, filed as application No. PCT/JP02/12556 on Nov. 29, 2002, now Pat. No. 8,243,803.

(30) Foreign Application Priority Data

Nov. 30, 2001 (JP) ................................. 2001-367940
Apr. 30, 2002 (JP) ................................. 2002-129434

(51) Int. Cl.
*H04N 7/12* (2006.01)
*H04N 11/02* (2006.01)
*H04N 11/04* (2006.01)

(52) U.S. Cl.
USPC ............ 375/240.12; 375/240.03; 375/240.18; 375/240.19; 375/240.2; 382/238; 382/239

(58) Field of Classification Search
USPC .... 375/240.03, 240.12, 240.18–240.2; 382/238, 382/239
See application file for complete search history.

(56) References Cited

U.S. PATENT DOCUMENTS 6,078,617 A * 6/2000 Nakagawa et al. ........... 375/240
6,205,176 B1 * 3/2001 Sugiyama ................ 375/240.12

(Continued)

FOREIGN PATENT DOCUMENTS

CN 1206993 A 2/1999
JP 58-85684 5/1983

(Continued)

OTHER PUBLICATIONS

Gisle Bjontegaard, et al., "H.26L Test Model Long Term No. 6 (TML-6) draft 0", ITU-Telecommunications Standardization Sector, Study Group 16, Question 6, Video Coding Experts Group (VCEG), $12^{TH}$ Meeting, [VCEG-L45], Jan. 9-12, 2001, pp. 29-32.

(Continued)

*Primary Examiner* — Chikaodili E Anyikire
(74) *Attorney, Agent, or Firm* — Oblon, Spivak, McClelland, Maier & Neustadt, L.L.P.

(57) ABSTRACT

A moving picture encoding device for encoding a moving picture constituted of a time sequence of frame pictures by motion compensation, the device including: a reference picture generation section configured to generate a reference picture subjected to predetermined picture processing from a reference frame picture, in accordance with an encoding condition of a predetermined area to be encoded; and a motion compensation section configured to calculate a motion compensation value for the predetermined area to be encoded, by using a generated reference picture subjected to the predetermined picture processing.

18 Claims, 19 Drawing Sheets

U.S. PATENT DOCUMENTS

| | | | | |
|---|---|---|---|---|
| 2002/0064229 A1* | 5/2002 | Nakaya | ........................ | 375/240.17 |
| 2002/0114392 A1* | 8/2002 | Sekiguchi et al. | ........ | 375/240.15 |
| 2002/0163969 A1* | 11/2002 | Zhong et al. | ............. | 375/240.17 |
| 2003/0035577 A1* | 2/2003 | Tran et al. | ...................... | 382/152 |
| 2003/0058949 A1* | 3/2003 | MacInnis et al. | ......... | 375/240.29 |
| 2003/0215014 A1* | 11/2003 | Koto et al. | ............... | 375/240.16 |

FOREIGN PATENT DOCUMENTS

| | | |
|---|---|---|
| JP | 4-127689 | 4/1992 |
| JP | 4-268892 | 9/1992 |
| JP | 5-130590 | 5/1993 |
| JP | 5-130592 | 5/1993 |
| JP | 05-130592 | 5/1993 |
| JP | 5-219498 | 8/1993 |
| JP | 5-244585 | 9/1993 |
| JP | 6-38197 | 2/1994 |
| JP | 7-131757 | 5/1995 |
| JP | 9-121359 | 5/1997 |
| JP | 10-191324 | 7/1998 |
| JP | 10-224795 | 8/1998 |
| JP | 11-46364 | 2/1999 |
| JP | 11-239351 | 8/1999 |
| JP | 11-262018 | 9/1999 |

OTHER PUBLICATIONS

Kazushi Sato, et al., "Adaptive MC Interpolation for Complexity Reduction", Joint Video Team (JVT) of ISO / IEC MPEG & ITU-T VCEG(ISO / IEC JTC1 / SC29 / WG11 and ITU-T SC16 Q.6), 4$^{TH}$ Meeting, [JVT-D080], Jul. 22-26, 2002, 12 Pages.

Gisle Bjontegaard, "H.26L Test Model Long Term No. 8 (TML-8) Draft0"; ITU-T Telecommunication Standarization Sector, Study Group 16, Video Coding Experts Group (VCEG) of ITU, Geneva, CH; Apr. 2, 2001; 1-54, XP001089814; 46 pgs.

"Clarification of Funny Position"; document Q15-K-27; ITU-T Telecommunication Standarization Sector of ITU, Geneva, CH, Study Group 16, Video Coding Experts Group (Question 15); Aug. 25, 2000; XP002310998; 3 pages.

Yoshihisa Yamada; "Performance Evaluation of Funny Position"; Joint Video Team (JVT) of ISO/IEC MPEG & ITU-T VCEG (ISO/IEC JTC1/SC29/WG11 and ITU-T SG16 Q6), XX, XX, No. JVT-D109; Jul. 26, 2002; pp. 1-4.

Supplementary European Search Report issued Feb. 1, 2010, in Europe Patent Application EP 02 78 3711.

Japanese Office Action issued Dec. 20, 2011 in patent application No. 2010-008493 with English translation.

Japanese Office Action issued Dec. 20, 2011 in patent application No. 2010-008497 with English translation.

Official Action Letters issued on Mar. 25, 2013, in the counterpart European Patent application (with English translation).

* cited by examiner

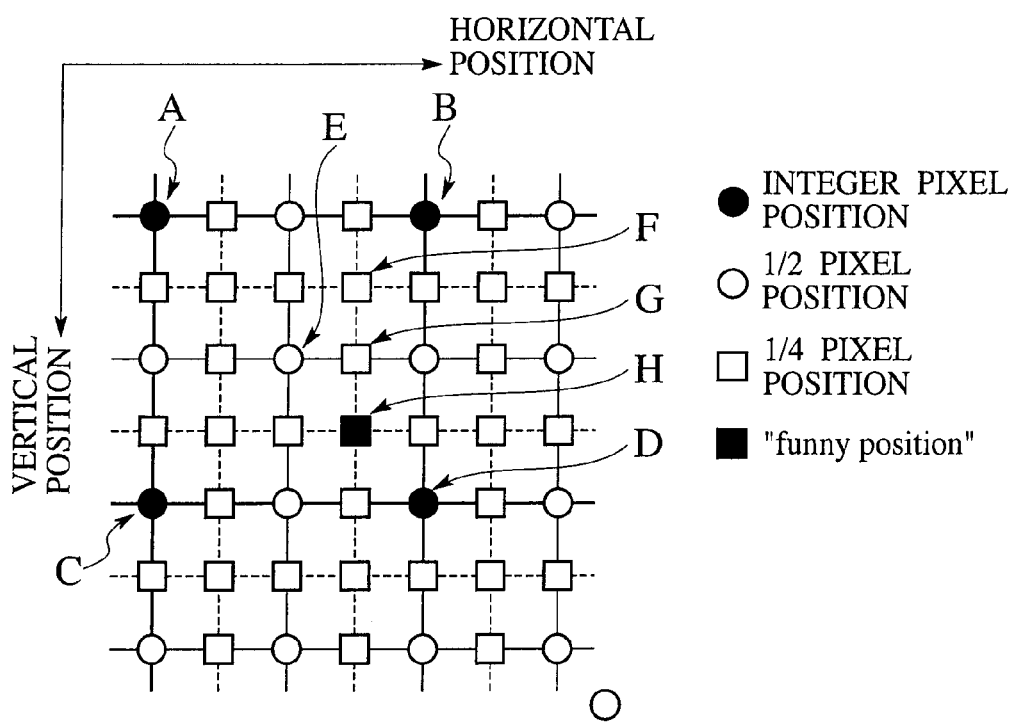

$PMVx_E = \text{median}(MVx_A, MVx_B, MVx_C)$
$PMVy_E = \text{median}(MVy_A, MVy_B, MVy_C)$ $MVDx = MVx_E - PMVx_E$
$MVDy = MVy_E - PMVy_E$

FIG.15

| REFERENCE FRAME CODE | REFERENCE FRAME PICTURE NUMBER | IDENTIFICATION INFORMATION OF REFERENCE PICTURE GENERATION PROCESSING METHOD |
|---|---|---|
| 0 | 1 | FIRST REFERENCE PICTURE |
| 1 | 2 | FIRST REFERENCE PICTURE |
| 2 | 3 | FIRST REFERENCE PICTURE |
| 3 | 4 | FIRST REFERENCE PICTURE |
| 4 | 5 | FIRST REFERENCE PICTURE |
| 5 | 1 | SECOND REFERENCE PICTURE |
| 6 | 2 | SECOND REFERENCE PICTURE |
| 7 | 3 | SECOND REFERENCE PICTURE |
| 8 | 4 | SECOND REFERENCE PICTURE |
| 9 | 5 | SECOND REFERENCE PICTURE |

FIG.16

| REFERENCE FRAME CODE | REFERENCE FRAME PICTURE NUMBER |
|---|---|
| 0 | 1 |
| 1 | 2 |
| 2 | 3 |
| 3 | 4 |
| 4 | 5 |

FIG.18

| MACRO-BLOCK MODE CODE | MACRO-BLOCK MODE | IDENTIFICATION INFORMATION OF REFERENCE PICTURE GENERATION PROCESSING METHOD |
|---|---|---|
| 0 | 16×16 | FIRST REFERENCE PICTURE |
| 1 | 16×8 | FIRST REFERENCE PICTURE |
| 2 | 8×16 | FIRST REFERENCE PICTURE |
| 3 | 8×8 | FIRST REFERENCE PICTURE |
| 4 | 8×4 | FIRST REFERENCE PICTURE |
| 5 | 4×8 | FIRST REFERENCE PICTURE |
| 6 | 4×4 | FIRST REFERENCE PICTURE |
| 7 | 16×16 | SECOND REFERENCE PICTURE |
| 8 | 16×8 | SECOND REFERENCE PICTURE |
| 9 | 8×16 | SECOND REFERENCE PICTURE |
| ⋮ | ⋮ | ⋮ |
| 13 | 4×4 | SECOND REFERENCE PICTURE |
| 14 | Intra 4×4 | |
| 15 | Intra 16×16(0,0,0) | |
| 16 | Intra 16×16(1,0,0) | |
| ⋮ | ⋮ | ⋮ |

FIG.23

| D | B | C |
|---|---|---|
| A | E | |

$PMVx_E = \text{median}(MVx_A, MVx_B, MVx_C)$ $PMVy_E = \text{median}(MVy_A, MVy_B, MVy_C)$ $PLayer_E = \text{median}(Layer_A, Layer_B, Layer_C)$ $MVDx = MVx_E - PMVx_E$ $MVDy = MVy_E - PMVy_E$ $LayerD = LayerE - PLayerE$

MOVING PICTURE ENCODING DEVICE, MOVING PICTURE DECODING DEVICE, MOVING PICTURE ENCODING METHOD, MOVING PICTURE DECODING METHOD, PROGRAM, AND COMPUTER READABLE RECORDING MEDIUM STORING PROGRAM

CROSS-REFERENCE TO RELATED APPLICATION

The present divisional application claims the benefit of priority under 35 U.S.C. §120 to application Ser. No. 10/496,017, filed Jun. 1, 2004, which is the National Stage of PCT/JP02/12556, filed on Nov. 29, 2002 and under 35 U.S.C. § 119 from Japanese applications Nos. 2001-367940, filed on Nov. 30, 2001 and 2002-129434 filed on Apr. 30, 2002, the entire contents of these applications are incorporated herein by reference.

TECHNICAL FIELD

The present invention relates to a moving picture encoding device, a moving picture decoding device, a moving picture encoding method, a moving picture decoding method, a program, and a computer readable recording medium which has stored the program.

BACKGROUND ART

As an example of a conventional moving picture encoding system, a moving picture encoding device and a moving picture decoding device will be described based on an "H. 26L encoding system" described in "ITU-T SG16 VCEG-M81, H. 26L Test Model Long Term Number 8 (TML-8)". FIG. 1 shows a configuration of the aforementioned moving picture encoding device 20, and FIG. 2 shows a configuration of the aforementioned moving picture decoding device 50.

The moving picture encoding device shown in FIG. 1 reduces a redundancy present in a time direction by motion compensation inter-frame prediction, and further reduces a redundancy left in a space direction by orthogonal transformation, so as to execute information compression of a moving picture (an input video signal). FIG. 3 shows an explanatory diagram of the motion compensation inter-frame prediction.

Hereinafter, an operation of the moving picture encoding device 20 shown in FIG. 1 will be described with reference to these drawings.

An input video signal 1 is constituted of a time sequence of frame pictures. Here, it is assumed that the frame picture to be encoded is divided into square rectangular areas (macro-blocks) of 16×16 pixels, and an encoding process in the moving picture encoding device 20 and a decoding process in the moving picture decoding device 50 are carried out by units of these macro-blocks. Additionally, the frame picture which is divided into the macro-block units is defined as "a frame picture signal 2".

According to the "H. 26L encoding system", what are available as "prediction modes" are an "INTRA prediction mode" for executing space prediction which uses pixel values of encoded neighboring areas on the same frame picture (e.g., pixel values adjacent to the upper and left sides of a frame picture signal 2 to be encoded), and a plurality of "INTER prediction modes" for executing motion compensation inter-frame prediction which uses encoded frame pictures (reference frame pictures 5) different with time.

The "H. 26L encoding system" is configured such that efficient information compression can be carried out by switching the "prediction mode" by a macro-block unit, in accordance with a local nature of the input video signal 1.

The "motion compensation inter-frame prediction" is a technology for searching an picture signal pattern similar to an picture signal pattern in the frame picture signal 2 within a predetermined search range of a reference frame picture 5, for detecting a spatial displacement amount between both picture signal patterns as a "motion vector 3", and for encoding and transmitting "motion compensation related information" containing the "motion vector 3," the "prediction mode" and a "reference frame number," as well as a "predicted residual signal 9" calculated in accordance with the motion vector 3.

According to the "H. 26L encoding system", as shown in FIG. 3, 7 kinds of "INTER prediction modes" are available. More exactly, in addition to these INTER prediction modes, available is a "skip mode" useful when a video is static, i.e., a prediction mode for directly copying a pixel in the same position of the reference frame picture 5 (the encoded frame picture) as it is.

As shown in FIG. 3, the motion vector 3 is detected by a unit of 16×16 pixels on a "mode 1", by a unit of 8×16 pixels on a "mode 2", by a unit of 16×8 pixels on a "mode 3", by a unit of 8×8 pixels on a "mode 4", by a unit of 4×8 pixels on a "mode 5", by a unit of 8×4 pixels on a "mode 6", and by a unit of 4×4 pixels on a "mode 7".

That is, these 7 kinds of prediction modes enable subdivision of motion detection units in the macro-block, and are disposed for the purpose of accurately grasping various motions that can be present in the macro-block.

First, an input section 31 transmits the frame picture signal 2 to a motion detection section 32 and a space prediction section 35.

Subsequently, the motion detection section 32 detects the number of motion vectors 3 corresponding to a predetermined prediction mode 4 for the received frame picture signal 2, by referring to the reference frame picture 5 sent from a frame memory 34.

Meanwhile, the space prediction section 35 carries out space prediction that uses pixel values of encoded neighboring areas on the same frame picture sent from the frame memory 34. The space prediction section 35 may execute space prediction by a plurality of methods.

Second, the motion detection section 32 transmits motion vectors 3 detected for all the "INTER prediction modes" shown in FIG. 3, and the prediction modes (e.g., modes 1 to 7) 4 corresponding to the motion vectors 3, to a motion compensation section 33.

Subsequently, the motion compensation section 33 generates a predicted picture signal (a macro-block unit) 6, by motion compensation which uses the reference frame picture 5 sent from the frame memory 34 and a combination of the plurality of motion vectors 3 and prediction modes 4 sent from the motion detection section 32.

Third, the motion compensation section 33 transmits information regarding the predicted picture signal 6 generated by the motion compensation, the prediction mode 4, the motion vectors 3 and encoding efficiency, to a prediction mode determining section 36. On the other hand, the space prediction section 35 transmits information regarding a predicted picture signal 7 generated by space prediction, the prediction mode (if there are a plurality of kinds of space prediction) 4 and encoding efficiency, to the prediction mode determining section 36.

Fourth, the prediction mode determining section 36 evaluates all the "INTER prediction modes" shown in FIG. 3 by a macro-block unit, so as to select an "INTER prediction mode" which is determined to be highest in encoding efficiency.

Additionally, the prediction mode determining section 36 similarly evaluates the "INTRA prediction modes", and selects the "INTRA prediction mode" if the "INTRA prediction mode" is higher in encoding efficiency than the "INTER prediction mode".

Then, the prediction mode determining section 36 transmits a predicted picture signal (a macro-block unit) 8 generated by the selected prediction mode 4, to a subtracter 37.

Additionally, when the "INTER prediction mode" is selected as the prediction mode 4, the prediction mode determining section 36 transmits "motion compensation related information" containing the number (up to 16 per macro-block) of motion vectors 3 or the like set on the selected "INTER prediction mode", to a variable length encoding section 40. On the other hand, when the "INTRA prediction mode" is selected as the prediction mode 4, the prediction mode determining section 36 transmits no motion vectors 3.

Fifth, an orthogonal transformation section 38 generates an orthogonal transformation coefficient 10, by applying orthogonal transformation to a difference value (a predicted residual signal 9) between the frame picture signal 2 and the predicted picture signal 8 sent from the subtracter 37.

Sixth, a quantization section 39 generates a quantized orthogonal transformation coefficient 11, by quantizing the orthogonal transformation coefficient 10 sent from the orthogonal transformation section 38.

Seventh, the variable length encoding section 40 carries out entropy encoding for the quantized orthogonal transformation coefficient 11 sent from the quantization section 39 and the prediction mode 4 (and motion vectors 3) sent from the prediction mode determining section 36, so as to multiplex them into a compressed stream 12.

The variable length encoding section 40 may transmit the compressed stream 12 to a moving picture decoding device 50 by a macro-block unit, or transmit the compressed stream 12 by a frame picture unit.

Additionally, an inverse quantization section 41 generates an orthogonal transformation coefficient 13, by carrying out inverse quantization for the quantized orthogonal transformation coefficient 11 sent from the quantization section 39. Then, an inverse orthogonal transformation section 42 generates a predicted residual signal 14, by carrying out inverse orthogonal transformation for the orthogonal transformation coefficient 13 sent from the inverse quantization section 41.

Next, at an adder 43, the predicted residual signal 14 sent from the inverse orthogonal transformation section 42 and the predicted picture signal 8 sent from the prediction mode determining section 36 are added together to generate a frame picture signal 15.

This frame picture signal 15 of a macro-block unit is stored in the frame memory 34. In the frame memory 34, there have been stored a reference frame picture 5 of a frame picture unit used for a subsequent encoding process, and information (a pixel value or a motion vector) of an encoded macro-block of a frame picture which is currently being encoded.

Next, an operation of the moving picture decoding device 10 shown in FIG. 2 will be described.

First, after reception of the compressed stream 12, a variable length decoding section 71 detects a synchronous word indicating a head of each frame, and restores the motion vector 3, the prediction mode 4 and the quantized orthogonal transformation coefficient 11 for each macro-block unit.

Then, the variable length decoding section 71 transmits the quantized orthogonal transformation coefficient 11 to an inverse quantization section 76, and transmits the prediction mode 4 to a switch 75.

Additionally, the variable length decoding section 71 transmits the motion vector 3 and the prediction mode 4 to a motion compensation section 72 when the prediction mode 4 is an "INTER prediction mode", and transmits the prediction mode 4 to a space prediction section 74 when the prediction mode 4 is an "INTRA prediction mode".

Next, when the prediction mode 4 is the "INTER prediction mode", the motion compensation section 72 generates a predicted picture signal 6, by using the motion vector 3 and the prediction mode 4 sent from the variable length decoding section 71 and referring to a reference frame picture 5 sent from a frame memory 73.

On the other hand, when the prediction mode 4 is the "INTRA prediction mode", the space prediction section 74 generates a predicted picture signal 7, by referring to an encoded picture signal of a neighboring area sent from the frame memory 73.

Next, the switch 75 chooses any one of the predicted picture signals 6 and 7, in accordance with the prediction mode 4 sent from the variable length decoding section 71, so sa to determine a predicted picture signal 8.

Meanwhile, the quantized orthogonal transformation coefficient 11 decoded by the variable length decoding section 71 is subjected to inverse quantization by the inverse quantization section 76, so as to be restored as an orthogonal transformation coefficient 10. And the orthogonal transformation coefficient 10 is subjected to inverse orthogonal transformation by an inverse orthogonal transformation section 77, so as to be restored as a predicted residual signal 9.

Then, at an adder 78, the predicted picture signal 8 sent from the switch 75 and the predicted residual signal 9 sent from the inverse orthogonal transformation section 77 are added together, and the frame picture signal 2 is thereby restored to be sent to an output section 80. The output section 80 outputs the signal to a display device (not shown) with predetermined timing, so as to reproduce an output video signal (a moving picture) 1A.

Additionally, the restored frame picture signal 2 is stored in the frame memory 73, so as to be used for a decoding process thereafter.

In the "TML-8", motion compensation which uses a concept of a "funny position" is realized. FIG. 4 shows this "funny position" together with an integer picture position, a ½ picture position, and a ¼ picture position. Incidentally, in the "TML-8", motion compensation of ¼ pixel accuracy is realized.

In FIG. 4, it is assumed that the motion vector 3 detected by the motion detection section 32 indicates an integer pixel position (the pixel position of (1 pixel, 1 pixel)) "D" in the reference frame picture 5 in relation to an integer pixel position "A" in the frame picture signal 2 to be encoded. In this case, a pixel value of the pixel position "D" in the reference frame picture 5 becomes a "motion compensation value" in relation to the pixel position "A" in the frame picture signal 2 to be encoded.

Next, it is assumed that the motion vector 3 indicates a ½ pixel position (the pixel position of (½ pixel, ½ pixel)) "E" in the reference frame picture 5 in relation to the integer pixel position "A" in the frame picture signal 2 to be encoded. In this case, an interpolation value obtained by independently operating 6 tap filters (1, −5, 20, 20, −5, 1)/32 vertically and horizontally for the pixel value of the integer pixel position in the reference frame picture 5 becomes a "motion compensation value" in relation to the pixel position "A" in the frame picture signal 2 to be encoded.

Next, it is assumed that the motion vector 3 indicates a ¼ pixel position (a pixel position of (¼ pixel, ¼ pixel)) "F" or "G" in the reference frame picture 5 in relation to the integer pixel position "A" in the frame picture signal 2 to be encoded. In this case, a linear interpolation value of a pixel value of a neighboring integer pixel position and a pixel value of a neighboring ½ pixel position 5 becomes a "motion compensation value" in relation to the pixel position "A" in the frame picture signal 2 to be encoded.

For example, when the motion vector 3 indicates the pixel position "F" in the reference frame picture 5 in relation to the pixel position "A" in the frame picture signal 2 to be encoded, an average of 4 points of the pixel value of the neighboring integer pixel position and the pixel values of the neighboring ½ pixel positions which surround the pixel position "F" becomes a "motion compensation value" in relation to the pixel position A in the frame picture signal 2 to be encoded.

Additionally, when the motion vector 3 indicates the pixel position "G" in the reference frame picture 5 in relation to the integer pixel position A in the frame picture signal 2 to be encoded, an average of 2 points of the pixel values of the ½ pixel positions which horizontally sandwich the pixel position "G" becomes a "motion compensation value" in relation to the pixel position A in the frame picture signal 2 to be encoded.

Further, when the motion vector indicates a pixel position of (N+¾ pixel, M+¾ pixel: N and M are given integers) in the reference frame picture 5 in relation to an integer pixel position in the frame picture signal 2 to be encoded, a "motion compensation value" in relation to the integer pixel position in the frame picture signal 2 to be encoded becomes an average of a pixel value of (N, M), a pixel value of (N, M+1), a pixel value of (N+1, M) and a pixel value of (N+1, M+1) in the reference frame picture 5. Here, (N+¾ pixel, M+¾ pixel: N and M are given integers) in the reference frame picture 5 is the aforementioned "funny position".

For example, when the motion vector 3 indicates a pixel position "H" (i.e., a "funny position") in the reference frame picture 5 in relation to the integer pixel position "A" in the frame picture signal 2 to be encoded, a "motion compensation value" in relation to the pixel position "A" in the frame picture signal 2 to be encoded is not a value calculated in the aforementioned case of the ¼ pixel position (e.g., the pixel position "F"), but a value obtained by calculation of (A+B+C+D)/4.

As described above, in the "H. 26L encoding system", many "INTER prediction modes" are available to enable elaborate motion compensation. Additionally, motion compensation based on the integer pixel position, the ½ pixel position, the ¼ pixel position and the funny position are available. By the foregoing configuration, while a configuration for prediction is elaborated, a mechanism is introduced to prevent breakage of the predicted picture signal 8 even if a frame picture signal 2 whose prediction would not be fulfilled is inputted.

The calculation of ¼ picture accuracy is carried out by linear interpolation of the pixel values of the neighboring pixel positions. Thus, a low-pass type operation is provided in a frequency space, so as to generate a smoothed predicted picture signal 6.

Additionally, when motion compensation based on the funny position is used, a "motion compensation value" is calculated based on an average of pixel values of 4 neighboring integer pixel positions, so as to generate a further smoothed predicted picture signal. If Gaussian noise is superimposed on the predicted picture signal, the smoothing has an effect of reducing a prediction error when this noise component is large.

Thus, in the "H. 26L encoding system" defined by the "TML-8", if noise is superimposed on the reference frame picture 5, or if many high-pass components are contained in the reference frame picture 5 and an error in prediction is flagrant, encoding efficiency is improved by using the calculation of ¼ pixel accuracy and the motion compensation based on the funny position.

However, the following problems conceivably occur in the conventional "H. 26L encoding system".

First, when a pixel position in the frame picture signal 2 to be encoded has a motion vector which indicates a pixel position (N+¾ pixel, M+¾ pixel: N and M are given integers) equal to the "funny position," a calculated "motion compensation value" is always subjected to strong smoothing, and especially it has been a problem that elaborate motion compensation is hindered at a high rate (a first problem).

That is, in the conventional "H. 26L encoding system", the "funny position" is defined by an absolute value of the motion vector 3. Thus, as shown in FIG. 5, for example, when blocks A, B, C, D and E move in parallel on a right lower side (¾ pixel, ¾ pixel), smoothed motion compensation is carried out based on a motion vector MV=(MVx, MVy)=(¾, ¾). Alternatively, motion compensation is carried out by feeding a motion vector different from real motion based on a motion vector MV=(MVx, MVy)=(½, ¾) or (¾, 1). Here, MVx indicates an X element of the motion vector, and MVy indicates a Y element of the motion vector.

Specifically, as shown in FIG. 5, in the conventional "H. 26L encoding system", when a block to be encoded is E, and a motion vector MV of the block E is $(MVx_E, MVy_E)$, an area expressed by "$MVx_E\%4=3$" and "$MVy_E\%4=3$" always is a "funny position," and a smoothed pixel value is chosen as a "motion compensation value" for the block E. Here, "%" is a quotient remainder calculation symbol, and a unit for expressing the motion vector MV is a ¼ pixel.

Thus, in the "H. 26L encoding system", since the motion vector (¾, ¾) indicates a smoothed pixel value present in a real (½, ½) pixel position, it has been a problem that the expressing of a pixel value of a pixel position (N+¾ pixel, M+¾ pixel: N and M are given integers) equal to the "funny position" is hindered from being expressed.

Second, in the generating of a predicted picture signal by ¼ pixel accuracy, effects of elaboration of prediction and smoothing of prediction are respectively expected at a high rate and a low rate. However, with regard to the smoothing of prediction at the low rate, motion compensation of ¼ pixel accuracy is not necessary but realization of motion compensation of ½ pixel accuracy is sufficient. Consequently, it has been a problem that detection of the motion vector of ¼ pixel accuracy which occupies a half of a parameter space of the motion vector for smoothing prediction is redundant.

The present invention, therefore, has been made with the foregoing problems in mind, and an object of the invention is to express a predicted picture signal with lighter overheads, and to provide motion compensation of different degrees of pixel accuracy.

DISCLOSURE OF THE INVENTION

A first feature of the present invention is summarized as a moving picture encoding device for encoding a moving picture constituted of a time sequence of frame pictures by motion compensation. The moving picture encoding device includes a motion vector detection section configured to detect a motion vector of a predetermined area to be encoded in the frame picture; a prediction section configured to predict the motion vector of the predetermined area to be encoded by using an encoded motion vector of a predetermined area in the frame picture; a determination section configured to determine whether or not the motion vector detected by the motion vector detection section is a predetermined motion vector set in accordance with the motion vector predicted by the prediction section; and a switching section configured to switch a method of calculating a motion compensation value for the predetermined area to be encoded depending on whether or not the motion vector detected by the motion vector detection section is the predetermined motion vector.

A second feature of the present invention is summarized as a moving picture decoding device for decoding a moving picture constituted of a time sequence of frame pictures by motion compensation. The moving picture decoding device includes a motion vector decoding section configured to decode a motion vector of a predetermined area to be decoded in the frame picture; a prediction section configured to predict the motion vector of the predetermined area to be decoded by using a decoded motion vector of a predetermined area in the frame picture; a determination section configured to determine whether or not the motion vector decoded by the motion vector decoding section is a predetermined motion vector set in accordance with the motion vector predicted by the prediction section; and a switching section configured to switch a method of calculating a motion compensation value for the predetermined area to be decoded depending on whether or not the motion vector decoded by the motion vector decoding section is the predetermined motion vector.

A third feature of the present invention is summarized as a moving picture encoding method for encoding a moving picture constituted of a time sequence of frame pictures by motion compensation. The moving picture encoding method includes a step A of detecting a motion vector of a predetermined area to be encoded in the frame picture; a step B of predicting the motion vector of the predetermined area to be encoded by using an encoded motion vector of a predetermined area in the frame picture; a step C of determining whether or not the motion vector detected in the step A is a predetermined motion vector set in accordance with the motion vector predicted in the step B; and a step D of switching a method of calculating a motion compensation value of the predetermined area to be encoded depending on whether or not the motion vector detected in the step A is the predetermined motion vector.

A fourth feature of the present invention is summarized as a moving picture decoding method for decoding a moving picture constituted of a time sequence of frame pictures by motion compensation. The moving picture decoding method includes a step A of decoding a motion vector of a predetermined area to be decoded in the frame picture; a step B of predicting the motion vector of the predetermined area to be decoded by using a decoded motion vector of a predetermined area in the frame picture; a step C of determining whether or not the motion vector decoded in the step A is a predetermined motion vector set in accordance with the motion vector predicted in the step B; and a step D of switching a method of calculating a motion compensation value of the predetermined area to be decoded depending on whether or not the motion vector decoded in the step A is the predetermined motion vector.

A fifth feature of the present invention is summarized as a program for causing a computer to function as a moving picture encoding device for encoding a moving picture constituted of a time sequence of frame pictures by motion compensation. The moving picture encoding device includes a motion vector detection section configured to detect a motion vector of a predetermined area to be encoded in the frame picture; a prediction section configured to predict the motion vector of the predetermined area to be encoded by using an encoded motion vector of a predetermined area in the frame picture; a determination section configured to determine whether or not the motion vector detected by the motion vector detection section is a predetermined motion vector set in accordance with the motion vector predicted by the prediction section; and a switching section configured to switch a method of calculating a motion compensation value of the predetermined area to be encoded depending on whether or not the motion vector detected by the motion vector detection section is the predetermined motion vector.

A sixth feature of the present invention is summarized as a program for causing a computer to function as a moving picture decoding device for decoding a moving picture constituted of a time sequence of frame pictures by motion compensation. The moving picture decoding device includes a motion vector decoding section configured to decode a motion vector of a predetermined area to be decoded in the frame picture; a prediction section configured to predict the motion vector of the predetermined area to be decoded by using a decoded motion vector of a predetermined area in the frame picture; a determination section configured to determine whether or not the motion vector decoded by the motion vector decoding section is a predetermined motion vector set in accordance with the motion vector predicted by the prediction section; and a switching section configured to switch a method of calculating a motion compensation value of the predetermined area to be decoded depending on whether nor not the motion vector decoded by the motion vector decoding section is the predetermined motion vector.

A seventh feature of the present invention is summarized as a computer readable recording medium which stores a program for causing a computer to function as a moving picture encoding device for encoding a moving picture constituted of a time sequence of frame pictures by motion compensation. The moving picture encoding device includes a motion vector detection section configured to detect a motion vector of a predetermined area to be encoded in the frame picture; a prediction section configured to predict the motion vector of the predetermined area to be encoded by using an encoded motion vector of a predetermined area in the frame picture; a determination section configured to determine whether or not the motion vector detected by the motion vector detection section is a predetermined motion vector set in accordance with the motion vector predicted by the prediction section; and a switching section configured to switch a method of calculating a motion compensation value of the predetermined area to be encoded depending on whether or not the motion vector detected by the motion vector detection section is the predetermined motion vector.

In the seventh feature of the invention, the predetermined motion vector is preferably set to be different from the motion vector predicted by the prediction section.

Additionally, in the seventh feature of the invention, when difference information between the motion vector predicted by the prediction section and the motion vector detected by the motion vector detection section is a predetermined value, the determination section preferably determines that the motion vector detected by the motion vector detection section is the predetermined motion vector.

An eighth feature of the present invention is summarized as a computer readable recording medium which stores a program for causing a computer to function as a moving picture decoding device for decoding a moving picture constituted of a time sequence of frame pictures by motion compensation. The moving picture decoding device includes a motion vector decoding section configured to decode a motion vector of a predetermined area to be decoded in the frame picture; a prediction section configured to predict the motion vector of the predetermined area to be decoded by using a decoded motion vector of a predetermined area in the frame picture; a determination section configured to determine whether or not the motion vector decoded by the motion vector decoding section is a predetermined motion vector set in accordance with the motion vector predicted by the prediction section; and a switching section configured to switch a method of calculating a motion compensation value of the predetermined area to be decoded depending on whether nor not the motion vector decoded by the motion vector decoding section is the predetermined motion vector.

In the eighth feature of the invention, the predetermined motion vector is preferably set to be different from the motion vector predicted by the prediction section.

Additionally, in the eighth feature of the invention, when difference information between the motion vector predicted by the prediction section and the motion vector decoded by the motion vector decoding section is a predetermined value, the determination section preferably determines that the motion vector decoded by the motion vector decoding section is the predetermined motion vector.

A ninth feature of the present invention is summarized as a moving picture encoding device for encoding a moving picture constituted of a time sequence of frame pictures by motion compensation. The moving picture encoding device includes a reference picture generation section configured to generate a plurality of different reference pictures by executing a plurality of different picture processing on a reference frame picture; a motion compensation section configured to calculate a motion compensation value for a predetermined area to be encoded by using the generated reference picture; and a transmission section configured to transmit a combination of information regarding the reference picture used for calculating the motion compensation value and information indicating the motion compensation value. The information regarding the reference picture is a combination of identification information of the reference frame picture and information indicating the picture processing.

A tenth feature of the present invention is summarized as a moving picture encoding device for encoding a moving picture constituted of a time sequence of frame pictures by motion compensation. The moving picture encoding device includes a reference picture generation section configured to generate a reference picture subjected to predetermined picture processing from a reference frame picture in accordance with an encoding condition of a predetermined area to be encoded; and a motion compensation section configured to calculate a motion compensation value for the predetermined area to be encoded by using the generated reference picture subjected to the predetermined picture processing.

An eleventh feature of the present invention is summarized as a moving picture decoding device for decoding a moving picture constituted of a time sequence of frame pictures by motion compensation. The moving picture decoding device includes a reference picture generation section configured to generate a plurality of different reference pictures by executing a plurality of different picture processing on a reference frame picture; a decoding section configured to decode information regarding a reference picture used for calculating a motion compensation value in a motion picture encoding device; and a motion compensation section configured to calculate a motion compensation value for a predetermined area to be decoded by using the generated reference picture specified by the information regarding the reference picture. The information regarding the reference picture is a combination of identification information of the reference frame picture and information indicating the picture processing.

A twelfth feature of the present invention is summarized as a moving picture decoding device for decoding a moving picture constituted of a time sequence of frame pictures by motion compensation. The moving picture decoding device includes a reference picture generation section configured to generate a reference picture subjected to predetermined picture processing from a reference frame picture in accordance with an encoding condition of a predetermined area to be decoded; and a motion compensation section configured to calculate a motion compensation value for the predetermined area to be decoded by using the reference picture subjected to the predetermined picture processing.

A thirteenth feature of the present invention is summarized as a moving picture encoding method for encoding a moving picture constituted of a time sequence of frame pictures by motion compensation. The moving picture encoding method includes a step A of generating a plurality of different reference pictures by executing a plurality of different picture processing on a reference frame picture; a step B of calculating a motion compensation value for a predetermined area to be encoded by using the generated reference picture; and a step C of transmitting a combination of information regarding the reference picture used for calculating the motion compensation value and information indicating the motion compensation value. The information regarding the reference picture is a combination of identification information of the reference frame picture and information indicating the picture processing.

A fourteenth feature of the present invention is summarized as a moving picture encoding method for encoding a moving picture constituted of a time sequence of frame pictures by motion compensation. The moving picture encoding method includes a step A of generating a reference picture subjected to predetermined picture processing from a reference frame picture in accordance with an encoding condition of a predetermined area to be encoded; and a step B of calculating a motion compensation value for the predetermined area to be encoded by using the generated reference picture subjected to the predetermined picture processing.

A fifteenth feature of the present invention is summarized as a moving picture decoding method for decoding a moving picture constituted of a time sequence of frame pictures by motion compensation. The moving picture decoding method includes a step A of generating a plurality of different reference pictures by executing a plurality of different picture processing on a reference frame picture; a step B of decoding information regarding a reference picture used for calculating a motion compensation value in a motion picture encoding device; and a step C of calculating a motion compensation value for a predetermined area to be decoded by using the generated reference picture specified by the information regarding the reference picture. The information regarding the reference picture is a combination of identification information of the reference frame picture and information indicating the picture processing.

A sixteenth feature of the present invention is summarized as a moving picture decoding method for decoding a moving picture constituted of a time sequence of frame pictures by motion compensation. The moving picture decoding method includes a step A of generating a reference picture subjected to predetermined picture processing from a reference frame picture in accordance with an encoding condition of a predetermined area to be decoded; and a step B of calculating a motion compensation value for the predetermined area to be decoded by using the generated reference picture subjected to the predetermined picture processing.

A seventeenth feature of the present invention is summarized as a program for causing a computer to function as a moving picture encoding device for encoding a moving picture constituted of a time sequence of frame pictures by motion compensation. The moving picture encoding device includes a reference picture generation section configured to generate a plurality of different reference pictures by executing a plurality of different picture processing on a reference frame picture; a motion compensation section configured to calculate a motion compensation value for a predetermined area to be encoded by using the generated reference picture; and a transmission section configured to transmit a combination of information regarding the reference picture used for calculating the motion compensation value and information indicating the motion compensation value. The information regarding the reference picture is a combination of identification information of the reference frame picture and information indicating the picture processing.

An eighteenth feature of the present invention is summarized as a program for causing a computer to function as a moving picture encoding device for encoding a moving picture constituted of a time sequence of frame pictures by motion compensation. The moving picture encoding device includes a reference picture generation section configured to generate a reference picture subjected to predetermined picture processing from a reference frame picture in accordance with encoding conditions of a predetermined area to be encoded; and a motion compensation section configured to calculate a motion compensation value for the predetermined area to be encoded by using the generated reference picture subjected to the predetermined picture processing.

A nineteenth feature of the present invention is summarized as a program for causing a computer to function as a moving picture decoding device for decoding a moving picture constituted of a time sequence of frame pictures by motion compensation. The moving picture decoding device includes a reference picture generation section configured to generate a plurality of different reference pictures by executing a plurality of different picture processing on a reference frame picture; a decoding section configured to decode information regarding a reference picture used for calculating a motion compensation value in a motion picture encoding device; and a motion compensation section configured to calculate a motion compensation value for a predetermined area to be decoded by using the generated reference picture specified by the information regarding the reference picture. The information regarding the reference picture is a combination of identification information of the reference frame picture and information indicating the picture processing.

A twentieth feature of the present invention is summarized as a program for causing a computer to function as a moving picture decoding device for decoding a moving picture constituted of a time sequence of frame pictures by motion compensation. The moving picture decoding device includes a reference picture generation section configured to generate a reference picture subjected to predetermined picture processing from a reference frame picture in accordance with an encoding condition of a predetermined area to be decoded; and a motion compensation section configured to calculate a motion compensation value for the predetermined area to be decoded by using the generated reference picture subjected to the predetermined picture processing.

A twenty-first feature of the present invention is summarized as a computer readable recording medium which stores a program for causing a computer to function as a moving picture encoding device for encoding a moving picture constituted of a time sequence of frame pictures by motion compensation. The moving picture encoding device includes a reference picture generation section configured to generate a plurality of different reference pictures by executing a plurality of different picture processing on a reference frame picture; a motion compensation section configured to calculate a motion compensation value for a predetermined area to be encoded by using the generated reference picture; and a transmission section configured to transmit a combination of information regarding the reference picture used for calculating the motion compensation value and information indicating the motion compensation value. The information regarding the reference picture is a combination of identification information of the reference frame picture and information indicating the picture processing.

In the twenty-first feature of the invention, it is preferable that the motion compensation section is configured to switch the reference picture used for calculating the motion compensation value by a unit for detecting the motion vector, and that the transmission section is configured to transmit the combination of the information regarding the reference picture and the information indicating the motion compensation value by a unit for detecting the motion vector.

In the twenty-first feature of the invention, it is preferable that the information regarding the reference picture is a combination of identification information indicating a unit for detecting the motion vector and the information indicating the picture processing, and that the transmission section is configured to transmit a combination of the information regarding the reference picture, the identification information of the reference frame picture and the information indicating the motion compensation value for each predetermined area to be encoded.

Additionally, in the twenty-first feature of the invention, it is preferable that the picture processing is a processing of changing space resolution, and that the motion compensation section is configured to reduce accuracy of the motion vector used for calculating the motion vector when the reference picture of low space resolution is used.

Additionally, in the twenty-first feature of the invention, it is preferable that, the information regarding the reference picture dynamically changes the combination of the identification information of the reference frame picture and the information indicating the picture processing, in accordance with an encoding condition of the predetermined area to be encoded.

Further, in the twenty-first feature of the invention, it is preferable that the information regarding the reference picture dynamically changes the combination of the identification information indicating the unit for detecting the motion vector and the information indicating the picture processing, in accordance with an encoding condition of the predetermined area to be encoded.

A twenty-second feature of the present invention is a computer readable recording medium which stores a program for causing a computer to function as a moving picture encoding device for encoding a moving picture constituted of a time sequence of frame pictures by motion compensation. The moving picture encoding device includes a reference picture generation section configured to generate a reference picture subjected to predetermined picture processing from a reference frame picture in accordance with an encoding condition of a predetermined area to be encoded; and a motion compensation section configured to calculate a motion compensation value for the predetermined area to be encoded by using the generated reference picture subjected to the predetermined picture processing.

In the twenty-second feature of the invention, it is preferable that the reference picture generation section is configured to generate the reference picture subjected to the predetermined picture processing in accordance with a type of a unit for detecting a motion vector.

Additionally, in the twenty-second feature of the invention, it is preferable that the reference picture generation section is configured to generate the reference picture subjected to the predetermined picture processing in accordance with a quantization step.

A twenty-third feature of the present invention is a computer readable recording medium which stores a program for causing a computer to function as a moving picture decoding device for decoding a moving picture constituted of a time sequence of frame pictures by motion compensation. The moving picture decoding device includes a reference picture generation section configured to generate a plurality of different reference pictures by executing a plurality of different picture processing on a reference frame picture; a decoding section configured to decode information regarding a reference picture used for calculating a motion compensation value in a motion picture encoding device; and a motion compensation section configured to calculate a motion compensation value for a predetermined area to be decoded by using the generated reference picture specified by the information regarding the reference picture. The information regarding the reference picture is a combination of identification information of the reference frame picture and information indicating the picture processing.

In the twenty-third feature of the invention, it is preferable that the decoding section is configured to decode information regarding the reference picture and information indicating the motion compensation value by a unit for detecting a motion vector, and that the motion compensation section is configured to switch the reference picture used for calculating the motion compensation value by the unit for detecting the motion vector.

In the twenty-third feature of the invention, it is preferable that the information regarding the reference picture is a combination of identification information indicating a unit for detecting the motion vector and information indicating the picture processing, and that the decoding section is configured to decode the information regarding the reference picture, identification information of the reference frame picture, and information indicating the motion compensation value by a unit of the predetermined area to be decoded. In addition, it is preferable that the motion compensation section is configured to calculate a motion compensation value for the predetermined area to be decoded by using the generated reference picture specified by the information regarding the reference picture and the identification information of the reference frame picture.

Additionally, in the twenty-third feature of the invention, it is preferable that the picture processing is a processing of changing space resolution, and that the motion compensation section is configured to reduce accuracy of the motion vector used for calculating the motion compensation value when the reference picture of low space resolution is used.

Additionally, in the twenty-third feature of the invention, it is preferable that the information regarding the reference picture dynamically changes the combination of the identification information of the reference frame picture and the information indicating the picture processing, in accordance with encoding conditions of the predetermined area to be decoded.

Further, in the twenty-third feature of the invention, it is preferable that the information regarding the reference picture dynamically changes the combination of the identification information indicating the unit for detecting the motion vector and the information indicating the picture processing, in accordance with an encoding condition of the predetermined area to be decoded.

A twenty-fourth feature of the present invention is a computer readable recording medium which stores a program for causing a computer to function as a moving picture decoding device for decoding a moving picture constituted of a time sequence of frame pictures by motion compensation. The moving picture decoding device includes a reference picture generation section configured to generate a reference picture subjected to predetermined picture processing from a reference frame picture in accordance with an encoding condition of a predetermined area to be decoded; and a motion compensation section configured to calculate a motion compensation value for the predetermined area to be decoded by using the generated reference picture subjected to the predetermined picture processing.

Additionally, in the twenty-fourth feature of the invention, it is preferable that the reference picture generation section is configured to generate the reference picture subjected to the predetermined picture processing, in accordance with a type of a unit for detecting a motion vector.

Further, in the twenty fourth-feature of the invention, it is preferable that the reference picture generation section is configured to generate the reference picture subjected to the predetermined picture processing, in accordance with a quantization step.

A twenty-fifth feature of the present invention is a moving picture encoding device for encoding a moving picture constituted of a time sequence of frame pictures by motion compensation. The moving picture encoding device includes a reference picture generation section configured to generate a plurality of different reference pictures by executing a plurality of different picture processing on a reference frame picture; a 3-dimensional motion vector generation section configured to generate a 3-dimensional motion vector by correlating a motion vector detected by using the reference picture with information indicating picture processing executed for the reference picture; a motion compensation section configured to calculate a motion compensation value for a predetermined area to be encoded by using the generated reference picture; and a transmission section configured to transmit a combination of the 3-dimensional motion vector and information indicating the motion compensation value.

A twenty-sixth feature of the present invention is a moving picture decoding device for decoding a moving picture constituted of a time sequence of frame pictures by motion compensation. The moving picture decoding device includes a reference picture generation section configured to generate a plurality of different reference pictures by executing a plurality of different picture processing on a reference frame picture; a decoding section configured to decode a 3-dimensional motion vector of a predetermined area to be decoded; and a motion compensation section configured to calculate a motion compensation value for the predetermined area to be decoded by using the generated reference picture specified by the 3-dimensional motion vector.

A twenty-seventh feature of the present invention is a moving picture encoding method for encoding a moving picture constituted of a time sequence of frame pictures by motion compensation. The moving picture encoding method includes a step A of generating a plurality of different reference pictures by executing a plurality of different picture processing on a reference frame picture; a step B of generating a 3-dimensional motion vector by correlating a motion vector detected by using the reference picture with information indicating picture processing executed for the reference picture; a step C of calculating a motion compensation value for a predetermined area to be encoded by using the generated reference picture; and a step D of transmitting a combination of the 3-dimensional motion vector and information indicating the motion compensation value.

A twenty-eighth feature of the present invention is a moving picture decoding method for decoding a moving picture constituted of a time sequence of frame pictures by motion compensation. The moving picture decoding method includes a step A of generating a plurality of different reference pictures by executing a plurality of different picture processing on a reference frame picture; a step B of decoding a 3-dimensional motion vector of a predetermined area to be decoded; and a step C of calculating a motion compensation value for the predetermined area to be decoded by using the generated reference picture specified by the 3-dimensional motion vector.

A twenty-ninth feature of the present invention is a program for causing a computer to function as a moving picture encoding device for encoding a moving picture constituted of a time sequence of frame pictures by motion compensation. The moving picture encoding device includes a reference picture generation section configured to generate a plurality of different reference pictures by executing a plurality of different picture processing on a reference frame picture; a 3-dimensional motion vector generation section configured to generate a 3-dimensional motion vector by correlating a motion vector detected by using the reference picture with information indicating picture processing executed for the reference picture; a motion compensation section configured to calculate a motion compensation value for a predetermined area to be encoded by using the generated reference picture; and a transmission section configured to transmit a combination of the 3-dimensional motion vector and information indicating the motion compensation value.

A thirtieth feature of the present invention is a program for causing a computer to function as a moving picture decoding device for decoding a moving picture constituted of a time sequence of frame pictures by motion compensation. The moving picture decoding device includes a reference picture generation section configured to generating a plurality of different reference pictures by executing a plurality of different picture processing on a reference frame picture; a decoding section configured to decode a 3-dimensional motion vector of a predetermined area to be decoded; and a motion compensation section configured to calculate a motion compensation value for the predetermined area to be decoded by using the generated reference picture specified by the 3-dimensional motion vector.

A thirty-first feature of the present invention is a computer readable recording medium which stores a program for causing a computer to function as a moving picture encoding device for encoding a moving picture constituted of a time sequence of frame pictures by motion compensation. The moving picture encoding device includes a reference picture generation section configured to generate a plurality of different reference pictures by executing a plurality of different picture processing on a reference frame picture; a 3-dimensional motion vector generation section configured to generate a 3-dimensional motion vector by correlating a motion vector detected by using the reference picture with information indicating picture processing executed for the reference picture; a motion compensation section configured to calculate a motion compensation value for a predetermined area to be encoded by using the generated reference picture; and a transmission section configured to transmit a combination of the 3-dimensional motion vector and information indicating the motion compensation value.

In the thirty-first feature of the invention, it is preferable that the reference picture generation section is configured to generate the plurality of different reference pictures by executing filter processing using a filter which has a plurality of different pass bands, and that the 3-dimensional motion vector identifies the filter.

Additionally, in the thirty-first feature of the invention, it is preferable that a 3-dimensional motion vector prediction section is provided for predicting a 3-dimensional motion vector by using a correlation between an encoded predetermined area in the frame picture and the predetermined area to be encoded, and that the transmission section is configured to transmit a combination of difference information between the 3-dimensional motion vector generated by the 3-dimensional motion vector generation section and the 3-dimensional motion vector predicted by the 3-dimensional motion vector prediction section as well as the information indicating the motion compensation value.

Additionally, in the thirty-first feature of the invention, it is preferable that the 3-dimensional motion vector prediction section is configured to predict the 3-dimensional motion vector by switching a context in arithmetic encoding.

Further, in the thirty-first feature of the invention, it is preferable that the picture processing is a processing of changing space resolution, and that the 3-dimensional motion vector generation section is configured to reduce accuracy of a 3-dimensional motion vector for a reference picture of low space resolution.

A thirty-second feature of the present invention is a computer readable recording medium which stores a program for causing a computer to function as a moving picture decoding device for decoding a moving picture constituted of a time sequence of frame pictures by motion compensation. The moving picture decoding device includes a reference picture generation section configured to generate a plurality of different reference pictures by executing a plurality of different picture processing on a reference frame picture; a decoding section configured to decode a 3-dimensional motion vector of a predetermined area to be decoded; and a motion compensation section configured to calculate a motion compensation value for the predetermined area to be decoded by using the generated reference picture specified by the 3-dimensional motion vector.

In the thirty-second feature of the invention, it is preferable that the reference picture generation section is configured to generate the plurality of different reference pictures by executing filter processing using a filter which has a plurality of different pass bands, and that the 3-dimensional motion vector identifies the filter.

Additionally, in the thirty-second feature of the invention, it is preferable that a 3-dimensional motion vector prediction section is provided for predicting a 3-dimensional motion vector by using a correlation between a decoded predetermined area in the frame picture and the predetermined area to be decoded, and that the motion compensation section is configured to calculate a motion compensation value for the predetermined area to be decoded by using difference information between the 3-dimensional motion vector decoded by the decoding section and the 3-dimensional motion vector predicted by the 3-dimensional motion vector prediction section.

Furthermore, in the thirty-second feature of the invention, it is preferable that the 3-dimensional motion vector prediction section is configured to predict the 3-dimensional motion vector by switching a context in arithmetic encoding.

BRIEF DESCRIPTION OF DRAWINGS

FIG. 3 is a diagram showing divided patterns of a macro-block in an INTER prediction mode according to the conventional technology.

FIG. 4 is a diagram showing a concept of a funny position according to the conventional technology.

FIG. 15 is an example of a reference frame code table used in the embodiment of the invention.

FIG. 16 is a part of the reference frame code table used in the embodiment of the invention.

FIG. 18 is a table of macro-block mode codes used in the modified example of the invention.

FIG. 23 is a diagram showing a method for calculating a predicted motion vector in the moving picture encoding device according to the embodiment of the invention.

Figure 1:
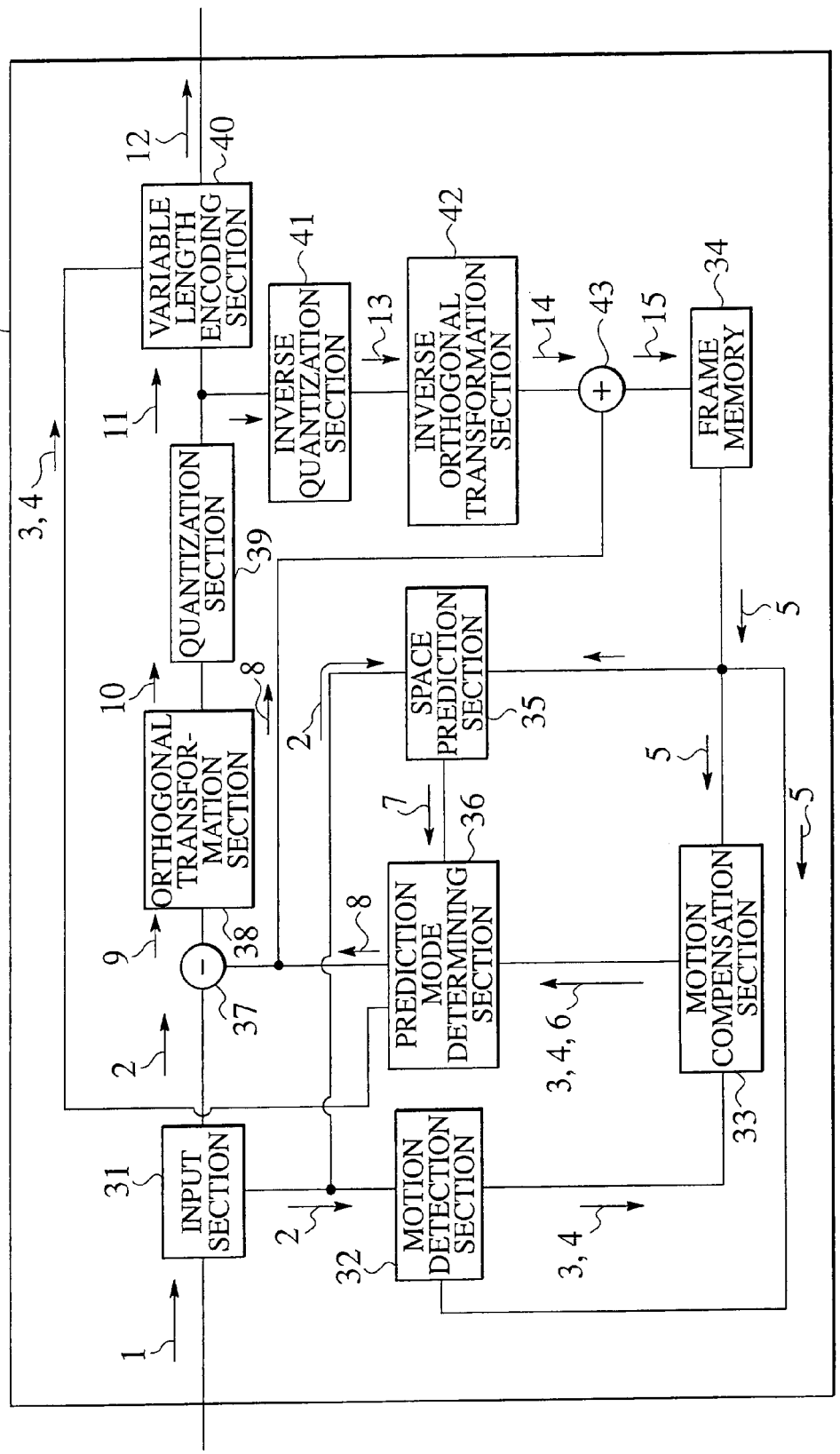
FIG. 1 is a schematic diagram of a moving picture encoding device according to a conventional technology.
Figure 2:
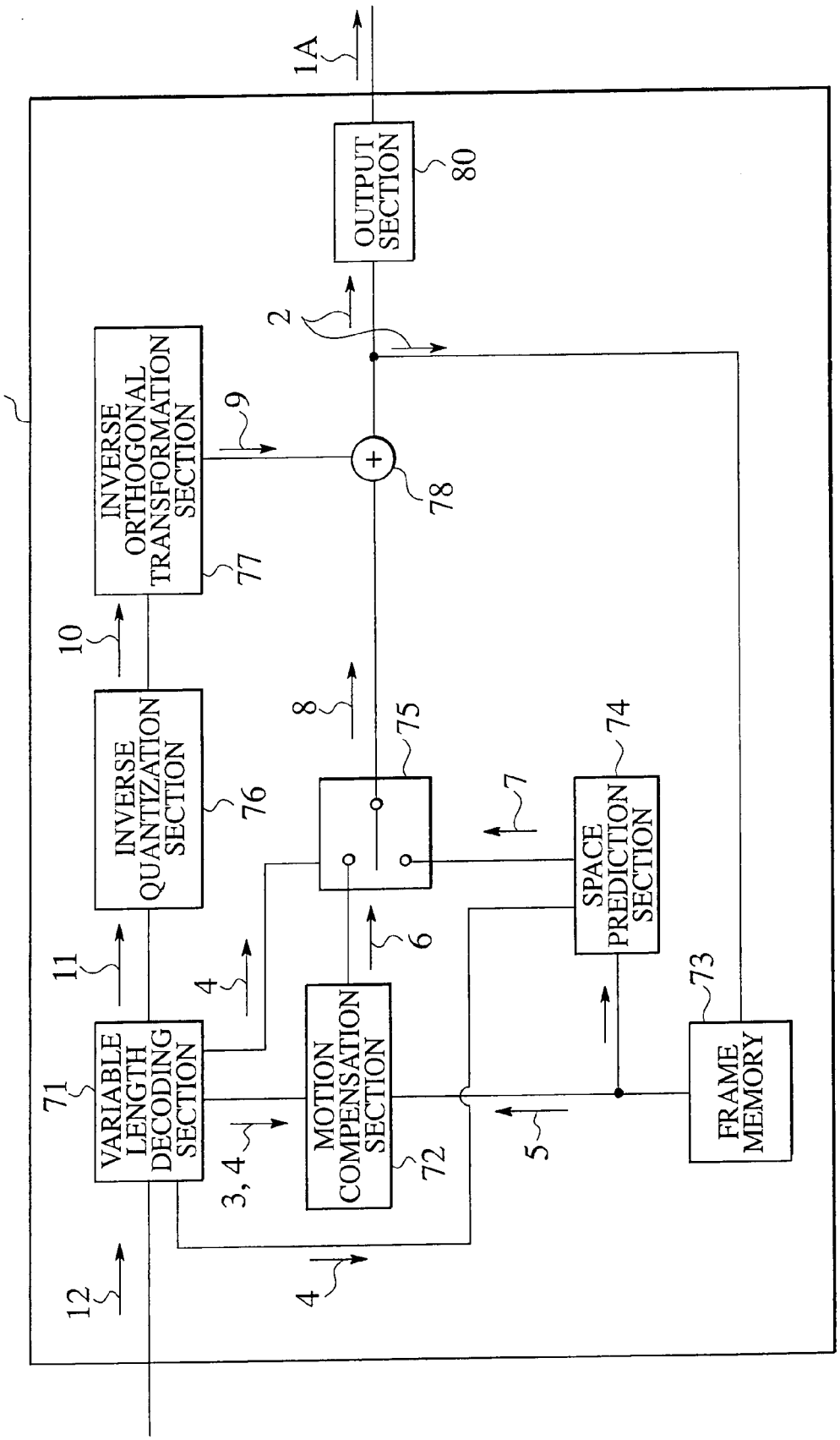
FIG. 2 is a schematic diagram of a moving picture decoding device according to the conventional technology.

BEST EMBODIMENT OF THE INVENTION (Embodiment 1)

In the first embodiment of the present invention, description will be made of a moving picture encoding device 20 and a moving picture decoding device 50 in which improvements are introduced in motion compensation in a "funny position" (a first problem) which has been a problem with an "H. 26L encoding system" defined by a conventional "TML-8".

According to the embodiment, except for motion compensation in the "funny position", operations thereof are similar to those of the moving picture encoding device 20 and the moving picture decoding device 50 described in the "TML-8". Thus, details thereof are omitted, and description will focus on the differences.

Specifically, the difference in configuration of the moving picture encoding device 20 and the moving picture decoding device 50 between the embodiment of the present invention and the conventional embodiment lies in the difference in configuration of the motion compensation sections 33 and 72 between the present and conventional technology.

In the embodiment of the present invention, since the motion compensation section 33 of the moving picture encoding device 20 and the motion compensation section 72 of the moving picture decoding device 50 have the same configuration. Thus, the motion compensation section 33 of the moving picture encoding device 20 will be described hereinafter.

Incidentally, the moving picture encoding device 20 of the embodiment is configured to encode a moving picture (an input video signal 1) constituted of a time sequence of frame pictures by motion compensation. The moving picture decoding device 50 of the embodiment is configured to decode a moving picture (an output video signal 1A) constituted of a time sequence of frame pictures by motion compensation.

Additionally, in the moving picture encoding device 20 of the embodiment, a motion detection section 32 constitutes a motion vector detection section configured to detect a motion vector 3 of a predetermined area (e.g., a macro-block) to be encoded in the frame picture. In the moving picture decoding device 50 of the embodiment, a variable length decoding section 71 constitutes a motion vector decoding section configured to decode a motion vector 3 of a predetermined area (e.g., a macro-block) to be decoded in the frame picture.

Figure 6:
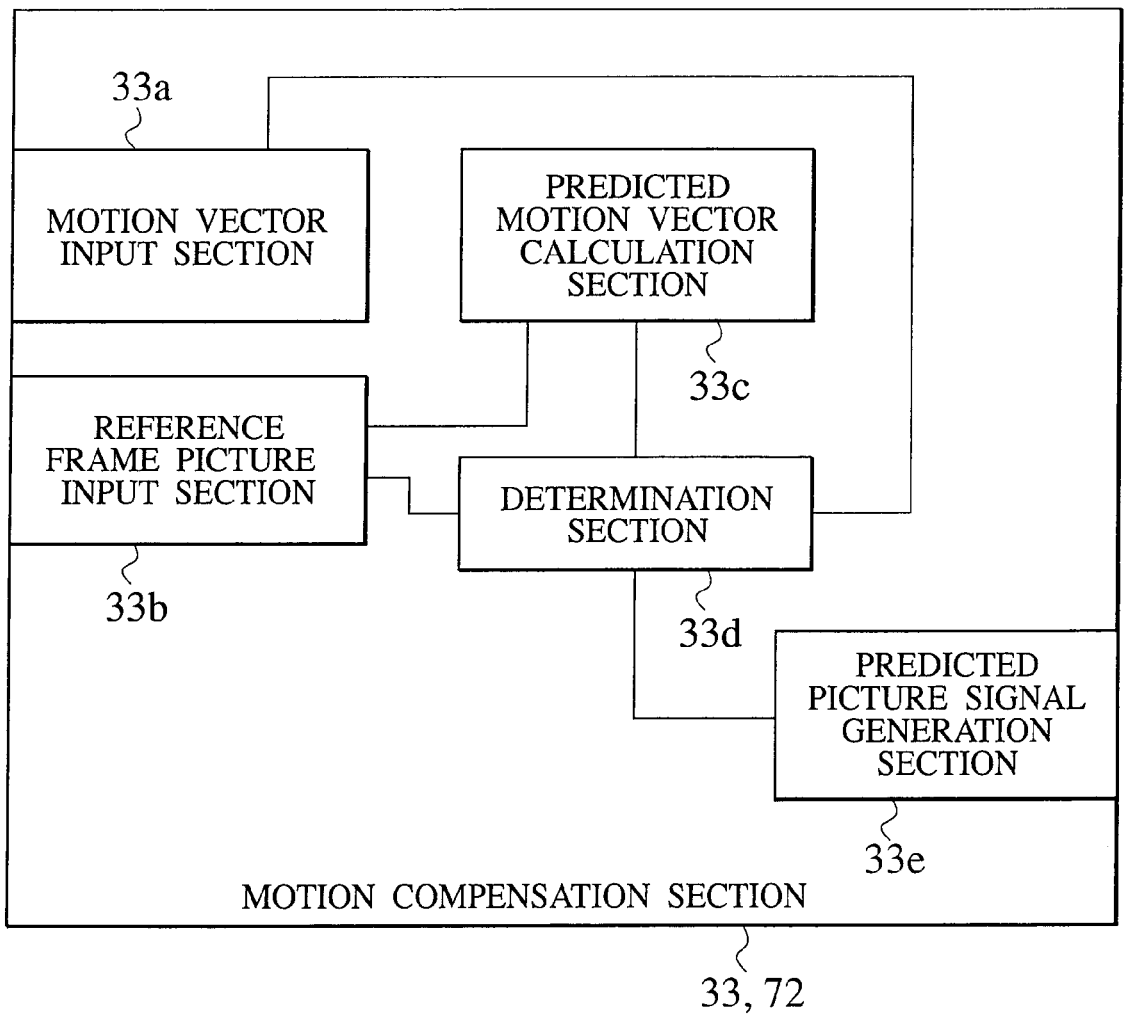
FIG. 6 is a functional block diagram of a motion compensation section of the moving picture encoding device according to the embodiment of the invention.

As shown in FIG. 6, the motion compensation section 33 of the moving picture encoding device 20 of the embodiment includes a motion vector input section 33a, a reference frame picture input section 33b, a predicted motion vector calculation section 33c, a determination section 33d, and a predicted picture signal generation section 33e.

According to the embodiment, the predicted motion vector calculation section 33c constitutes a prediction section configured to predict a predicted motion vector $PMV_E=(PMVx_E, PMVy_E)$ of a predetermined area (a macro-block E) to be encoded, by using an encoded motion vector (e.g., $MV_A=(MVx_A, MVy_A)$, $MV_B=(MVx_B, MVy_B)$, $MV_C=(MVx_C, MVy_C)$ of a predetermined area in the frame picture.

Additionally, the determination section 33d constitutes a determination section configured to determine whether or not a motion vector $MV_E=(MVx_E, MVy_E)$ detected by the motion vector detection section (the motion detection section 32) is a predetermined motion vector (the motion vector indicating a "funny position") set in accordance with a motion vector $MPV_{E=(PMVxE}, PMVy_E)$ predicted by the prediction section (the predicted motion vector calculation section 33c).

Further, the predicted picture signal generation section 33e constitutes a switching section configured to switch a method for calculating a "motion compensation value" of the predetermined area to be encoded (the generation method of predicted picture signal 6), depending on whether or not the motion vector $MV_E=(MVx_E, MVy_E)$ detected by the motion vector detection section (the motion detection section 32) is a predetermined motion vector (the motion vector indicating a "funny position").

The motion vector input section 33a is connected to the determination section 33d, and is configured to receive the motion vector $MV_E$ detected by the motion detection section 32, so as to transmit the motion vector $MV_E$ to the determination section 33d.

The reference frame picture input section 33b is connected to the predicted motion vector calculation section 33c and the determination section 33d, and is configured to extract motion vectors of neighboring areas (macro-blocks A, B and C) of the predetermined area to be encoded, which are stored in a frame memory 34, so as to transmit the vectors to the predicted motion vector calculation section 33c. Also, the reference frame picture input section 33 is configured to extract a reference frame picture 5 stored in the frame memory 34, so as to transmit the reference frame picture 5 to the determination section 33d.

The predicted motion vector calculation section 33c is connected to the reference frame picture input section 33b and the determination section 33d, and is configured to calculate a predicted motion vector $PMV_E=(PMVx_E, PMVy_E)$ which is a predicted value of a motion vector $MV_E=(MVx_E, MVy_E)$ of the predetermined area (the macro-block) to be encoded, by using, e.g., the motion vectors (encoded motion vectors of the predetermined areas in the frame picture) $MV_A$, $MV_B$ and $MV_C$ of the neighboring areas (the macro-blocks A, B and C) of the predetermined area to be encoded, which are stored in the frame memory 34.

Here, $PMVx_E$ indicates a horizontal element (an X element) of a predicted motion vector, and $PMVy_E$ indicates a vertical element (a Y element) of the predicted motion vector.

According to the "TML-8", in order to efficiently encode the motion vector, a motion vector of a predetermined area to be encoded is predicted and encoded by a prediction system called "median prediction" through using an encoded motion vector of a neighboring area included in the reference frame picture 5.

Figure 5:
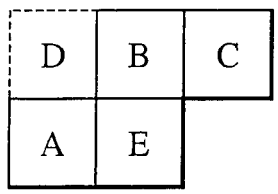
FIG. 5 is a diagram showing a method for calculating a predicted motion vector in a moving picture encoding device according to an embodiment of the present invention.

In FIG. 5, since $MV_A=(MVx_A, MVy_A)$, $MV_B=(MVx_B, MVy_B)$ and $MV_C=(MVx_C, MVy_C)$ which are motion vectors MV of the neighboring areas (macro-blocks) A, B and C have been encoded, an average of the horizontal elements $MVx_A$, $MVx_B$ and $MVx_C$ of the motion vectors is obtained to be set as the horizontal element $PMVx_E$ for a predicted motion vector of the predetermined area (the macro-block) E to be encoded, and an average of the vertical elements $MVy_A$, $MVy_B$ and $MVy_C$ of the motion vectors is obtained to be set as a vertical element $PMVy_E$ of a predicted motion vector of the predetermined area (the macro-block) E to be encoded.

For example, in the case of a prediction mode (an encoding mode) in which the neighboring areas (the macro-blocks) A, B and C used for calculating the predicted motion vector PMV are outside the frame picture or have no motion vectors, a predicted motion vector PMV is set as a zero vector.

Further, when 3 or more motion vectors are not present in the neighboring areas (the macro-blocks) A, B and C used for calculating the predicted motion vector PMV of the predetermined area (the macro-block) E to be encoded, a value of a predicted motion vector $PMV_E$ of the predetermined area (the macro-block) E to be encoded is always obtained, by using an assumption that the motion vectors of the neighboring areas (the macro-blocks) A, B and C are set to zero vectors or other assumptions.

Additionally, the predicted motion vector calculation section 33c calculates difference information MVD=(MVDx, MVDy) between the motion vector $MV_E$ from the motion vector input section 33a and the predicted motion vector $PMV_E$. Here, MVDx which is an X element of the difference information is calculated by "$MVx_E-PMVx_E$", and MVDy which is a Y element of the difference information MVD is calculated by "$MVy_E-PMVy_E$".

In the "H. 26L encoding system", in order to improve transmission efficiency, the motion vector MV is encoded in a form of the aforementioned difference information MVD so as to be transmitted.

The determination section 33d is connected to the motion vector input section 33a, the reference frame picture input section 33b, the predicted motion vector calculation section 33c and the predicted picture signal generation section 33e. The determination section 33d is configured to determine a method of generating a predicted picture signal 6 (a method for calculating a motion compensation value), so as to put the method to the predicted picture signal generation section 33e, in accordance with the motion vector $MV_E$ from the motion vector input section 33a and the predicted motion vector $PMV_E$ from the predicted motion vector calculation section 33c.

Figure 7:
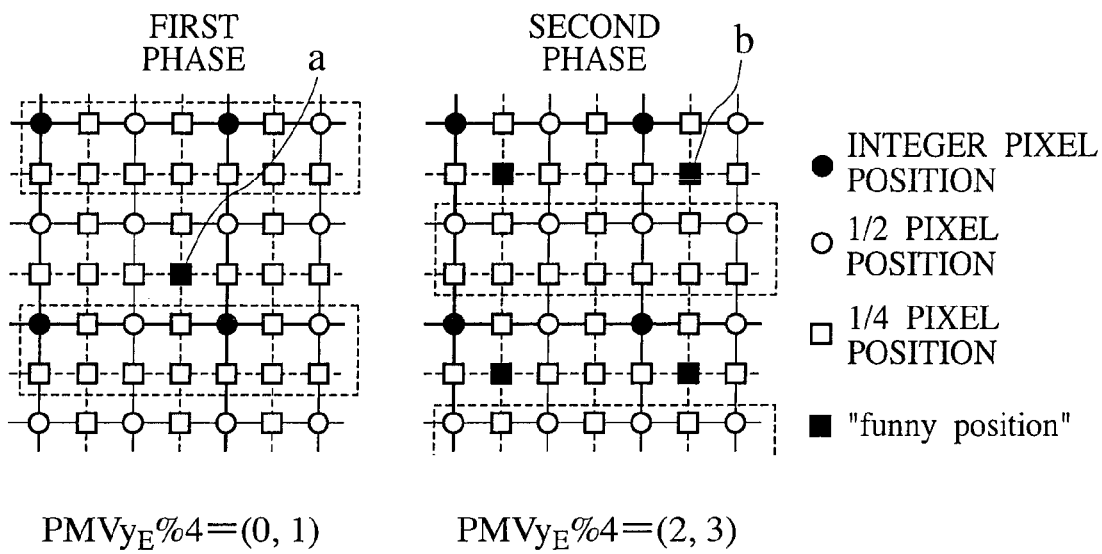
FIG. 7 is a diagram showing a concept for determining a "funny position" in the moving picture encoding device according to the embodiment of the invention.

Specifically, as shown in FIG. 7, the determination section 33d determines whether or not the motion vector $MV_E$ indicates a "funny position" in accordance with a phase of the vertical component $PMVy_E$ of the predicted motion vector generated by the predicted picture signal generation section 33e and the motion vector $MV_E$ detected by the motion detection section 32, and puts a result of the determination to the predicted picture signal generation section 33e.

Hereinafter, a unit regarding expression of the predicted motion vector $PMV_E$ and the motion vector $MV_E$ is a ¼ pixel.

First, in the case of "$PMVy_E\%4=0$ or 1" (i.e., $PMVy_E$ is a first phase), "$MVx_E\%4=3$" and "$MVy_E\%4=3$", the determination section 33d determines that the motion vector $MV_E$ ($MVx_E$, $MVy_E$) of the predetermined area (the macro-block E) to be encoded indicates a "funny position".

Second, in the case of "$PMVy_E\%4=2$ or 3" (i.e., $PMVy_E$ is a second phase), "$MVx_E\%4=1$" and "$MVy_E\%4=1$", the determination section 33d determines that the motion vector $MV_E$ ($MVx_E$, $MVy_E$) of the predetermined area (the macroblock E) to be encoded indicates the "funny position."

As a result, an area indicated by the predicted motion vector $PMV_E$ is adjusted so as not to be superimposed on the "funny position". That is, the predicted motion vector $PMV_E$ predicted by the predicted motion vector calculation section 33c (the prediction section) is set to be different from the motion vector (the predetermined motion vector) indicating the "funny position".

In the case that $PMVy_E$ is a first phase, the motion compensation of the conventional "H. 26L encoding system" is applied as it is (i.e., the motion vector indicating a pixel position a (see FIG. 7) indicates the "funny position").

Additionally, in the case that $PMVy_E$ is a second phase, a motion vector indicating a different pixel position b (see FIG. 7) is supposed to indicate the "funny position". However, an obtained "motion compensation value" is smoothed as an average of pixel values of 4 neighboring integer pixel positions which surround the motion vector, and other motion compensation processing is similar to the motion compensation processing of the conventional "H. 26L encoding system".

The predicted picture signal generation section 33e is connected to the determination section 33d, and is configured to generate a predicted picture signal 6, by switching the "generation method of a predicted picture signal 6" regarding the predetermined area (the macro-block) to be encoded.

Specifically, when it is determined that the motion vector $MV_E$ of the predetermined area (the macro-block E) to be encoded, which is detected by the motion detection section 32, indicates the "funny position", the predicted picture signal generation section 33e smoothes the predicted picture signal 6 of the predetermined area as an average of pixel values of the 4 neighboring integer pixel positions which surround the pixel position indicated by the motion vector $MV_E$, and generates the predicted picture signal 6 of the predetermined area by the conventional "H. 26L encoding system" in other cases.

Incidentally, in the present embodiment, the motion compensation section 33 and the motion detection section 32 are separately disposed. However, the motion compensation section 33 and the motion detection section 32 may be integrally disposed.

Figure 8:
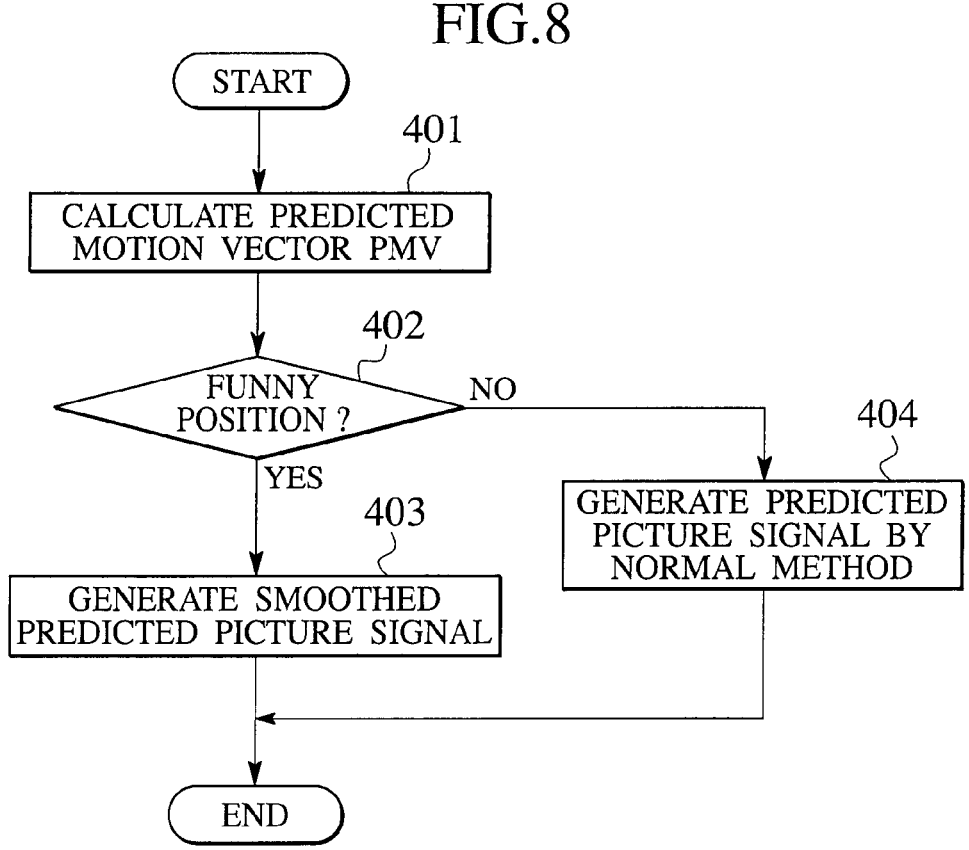
FIG. 8 is a flowchart showing an operation of the motion compensation section of the moving picture encoding device according to the embodiment of the invention.

FIG. 8 shows operation of the aforementioned motion compensation section 33.

In step 401, the predicted motion vector calculation section 33c calculates a predicted motion vector $PMV_E$ which is a predicted value of a motion vector of a predetermined area (a macro-block E in FIG. 5) to be encoded in a frame picture, based on encoded motion vectors $MV_A$, $MV_B$ and $MV_C$ of neighboring areas (the macro-blocks A, B and C in FIG. 5) in the same frame picture.

In step 402, the determination section 33d determines whether or not a motion vector $MV_E$ indicates a "funny position", in accordance with a phase of a vertical element $PMVy_E$ of the predicted motion vector from the predicted motion vector calculation section 33c and the motion vector $MV_E$ from the motion vector input section 33a.

In step 403, when the aforementioned motion vector $MV_E$ indicates the "funny position", the predicted picture signal generation section 33e generates a predicted picture signal 6 of the predetermined area in a smoothed form.

In step 404, when the aforementioned motion vector $MV_E$ does not indicate the "funny position", the predicted picture signal generation section 33e generates a predicted picture signal 6 of the predetermined area by the conventional "H. 26L encoding system".

Figure 9:
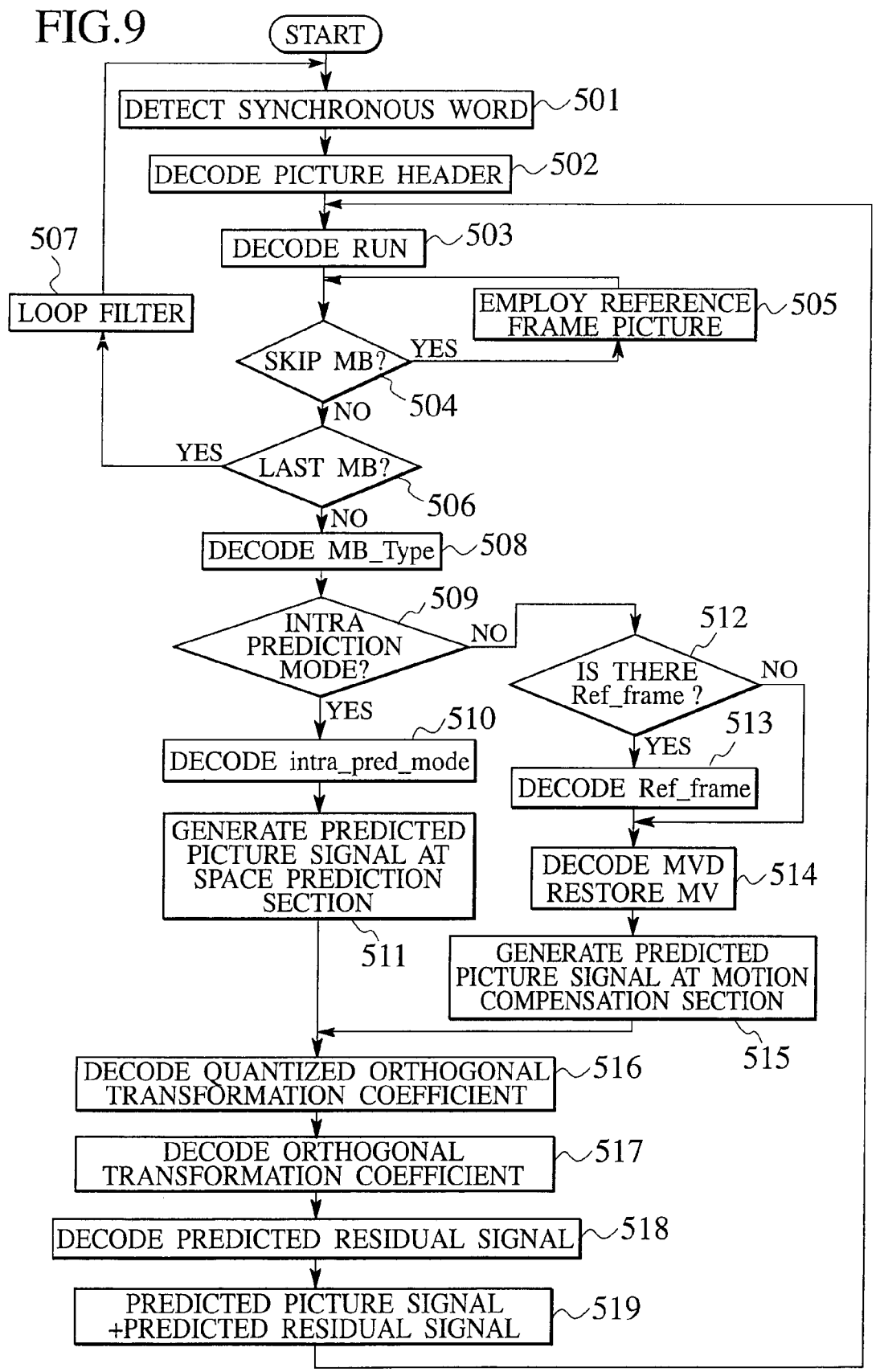
FIG. 9 is a flowchart showing a decoding process in the moving picture decoding device according to the embodiment of the present invention.
Figure 10:
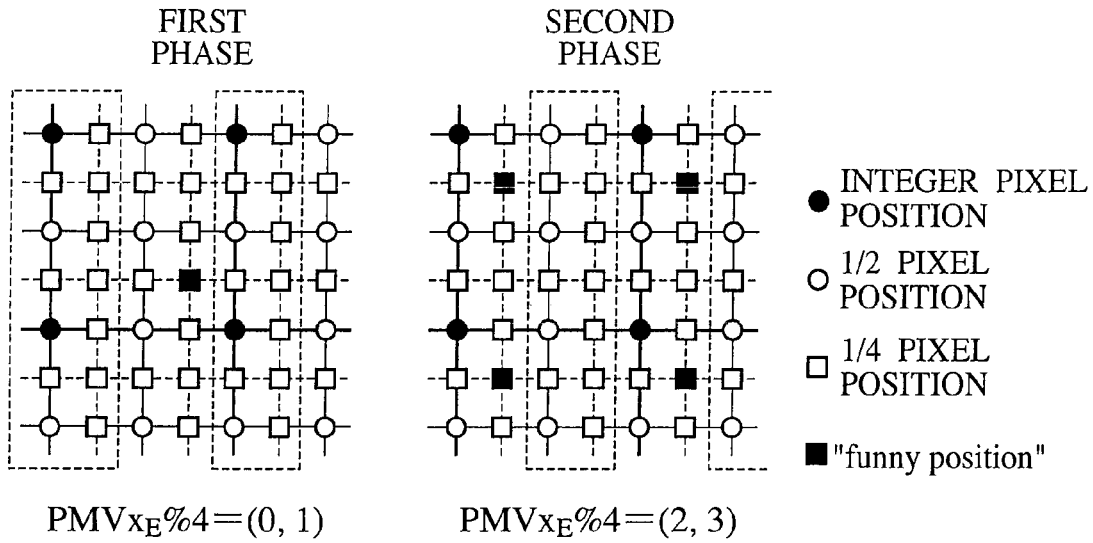
FIG. 10 is a diagram showing a concept for determining a "funny position" in a moving picture encoding device according to a modified example of the present invention.

Next, steps for a decoding process in the moving picture decoding device 50 will be described with reference to FIG. 9.

In step 501, the variable length decoding section 71 detects a "synchronous word" which indicates a head of a picture (each frame picture constituting an input video signal 1).

In step 502, the variable length decoding section 71 decodes a "picture header" of the aforementioned picture. The "picture header" contains "picture type information" for determining whether the picture is a "picture which encodes all the macro-blocks constituting the picture by an INTRA prediction mode (hereinafter referred to as "I picture")" or a "picture which uses an INTER prediction mode (hereinafter referred to as a "P picture")." Also, the picture header contains a value of a quantization parameter in an orthogonal transformation coefficient and the like.

Subsequently, the process proceeds to the decoding of data of each macro-block layer constituted of a predetermined syntax.

In step 503, the variable length decoding section 71 decodes a "RUN" in the macro-block layer. The "RUN" indicates the number of repeated macro-blocks in which data of the macro-block layer is zero, and macro-blocks (skip MBs) to which as many skip modes as the number of the "RUN" are applied are generated.

In step 504, it is determined whether or not a macro-block to be decoded is a skip MB.

If the macro-block is a skip MB, in step 505, an area of 16×16 pixels in the same position on a predetermined reference frame picture 5 stored in the frame memory 73 is employed, as it is, for a predicted picture signal 6. This processing is carried out by transmitting a motion vector whose value is zero and an identification number of the predetermined reference frame picture to the motion compensation section 72 by the variable length decoding section 71.

If the macro-block is not a skip MB, in step 506, it is determined whether or not the "RUN" of the MB indicates the last MB of the picture.

If the "RUN" of the MB is the last MB, in step 507, the variable length decoding of the picture is terminated, and a variable length decoding of a next picture begins.

If the "RUN" is neither the skip MB nor the last MB, i.e., if the "RUN" is a normal MB, in step 508, the variable length decoding section 71 decodes a "MB_Type (a macro-block type). By the "MB_Type", a prediction mode 4 of the predetermined area (the macro-block) to be decoded is established. In step 509, it is determined whether or not the established prediction mode 4 is an "INTER prediction mode".

If the prediction mode 4 is the "INTRA prediction mode", in step 510, the variable length decoding section 71 decodes an "intra_pred_mode". In step 511, the space prediction section 74 executes space prediction from a pixel value of a neighboring area based on the "intra_pred_mode", so as to generate a predicted picture signal 7.

If the prediction mode 4 is the "INTER prediction mode", the prediction mode 4 is one of the modes 1 to 7 shown in FIG. 3. Thus, at this time, the numbers of "Ref_frames (reference frame picture numbers)" and "MVDs (difference information of motion vector)" to be decoded are established. In accordance with such information, the variable length decoding section 71 decodes a combination of the "Ref_frame" and the "MVD".

However, because determination of whether or not the "Ref_frame" has been multiplexed is integrated into the aforementioned "picture type information", in step 512, it is determined whether or not the "Ref_frame" is present in accordance with a value of the "picture type information".

If the "Ref_frame" is present, in step 513, the variable length decoding section 71 decodes the "Ref_frame", and then, in step 514, the variable length decoding section 71 decodes the "MVD". If the "Ref_frame" is not present, only the "MVD" is decoded in step 514.

In step 514, based on the prediction mode 4 established by the "Ref_frame", the "MVD" and the "MB_Type" which have been obtained, motion vectors MV corresponding to all the 4×4 blocks in the MB are restored.

In step 515, the motion compensation section 72 generates a predicted picture signal 6 for each of 4×4 blocks based on the "Rev_frame" and the motion vector MV. Processing regarding the "funny position" is reflected here.

In step 516, the variable length decoding section 71 restores a quantized orthogonal transformation coefficient 11. In step 517, the inverse quantization section 76 restores the orthogonal transformation coefficient 10. In step 518, the inverse orthogonal transformation section 77 restores a predicted residual signal 9.

In step 519, at the adder 78, a predicted picture signal 8 from the switch 75 and the predicted residual signal 9 from the inverse orthogonal transformation section 77 are summed up to obtain a frame picture signal 2 of the MB. Then, the process proceeds to the decoding of a next MB.

Operations/Effects of Moving Picture Encoding and Decoding Devices According to the Embodiment 1

According to the moving picture encoding device of the embodiment, the predicted picture signal generation section 33e switches the method of calculating a motion compensation value for the predetermined area to be encoded, in accordance with the determination result of the determination section 33d, i.e., the predicted motion vector predicted by the predicted motion vector calculation section 33c. For this reason, it is possible to express a pixel value of the same pixel position (N+¾ pixel, M+¾ pixel: N and M are given integers) as the "funny position".

Moreover, it is possible to solve the problem of strong smoothing being always applied to the "motion compensation value" in the area (e.g., the macro-block or sub-block) having a motion vector which indicates the same pixel position as the "funny position".

The method of generating a predicted picture signal or a motion compensation value described in the embodiment is merely an example. A given generation method necessary for realizing the switching of the calculation method of the motion compensation value executed according to the embodiment can be used.

MODIFIED EXAMPLE 1A

Description will be made of a modified example 1A of the moving picture encoding device 20 and the moving picture decoding device 50 of the foregoing Embodiment 1. Hereinafter, only differences from the Embodiment 1 will be described.

With regard to the moving picture encoding device 20 and the moving picture decoding device 50 according to the modified example, modification is introduced in the motion compensation section 33 of the moving picture encoding device 20 and the motion compensation section 72 of the moving picture decoding device 50 of the foregoing embodiment. The motion compensation section 33 of the moving picture encoding device 20 and the motion compensation section 72 of the moving picture decoding section 50 are identical. Thus, hereinafter, the motion compensation section 33 of the moving picture encoding device 20 will be described.

According to the modified example, the determination section 33d of the motion compensation section 33 determines whether or not the motion vector indicates a "funny position" in accordance with a phase of a horizontal element $PMVx_E$ of a predicted motion vector and the motion vector $MV_E = (MVx_E, MVy_E)$ detected by the motion detection section 32. Subsequently, a result of the determination is reported to the predicted picture signal generation section 33e by the determination section 33d. Hereinafter, a unit regarding expression of the motion vector $MV_E = (MVx_E, MVy_E)$ is a ¼ pixel.

First, in the case of "$PMVx_E\%4 = 0$ or $1$" (i.e., $PMVx_E$ is a first phase), "$MVx_E\%4 = 3$" and "$MVy_E\%4 = 3$", the determination section 33d determines that the motion vector $MV_E$ $(MVx_E, MVy_E)$ indicates a "funny position".

Second, in the case of "$PMVx_E\%4 = 2$ or $3$" (i.e., $PMVx_E$ is a second phase), "$MVx_E\%4 = 1$" and "$MVy_E\%4 = 1$," the determination section 33d determines that the motion vector $MV_E$ $(MVx_E, MVy_E)$ indicates the "funny position".

As a result, an area indicated by the predicted motion vector $PMV_E$ is adjusted so as not to be superimposed on the "funny position". That is, the motion vector indicating the "funny position" is set to be different from the predicted motion vector $PMV_E$.

As described above, the modified example 1A has an effect of reducing a possibility of superimposition of the motion vector which becomes a "funny position" on real motion, by using the predicted encoding structure of the motion vector. In FIG. 5, for example, even if the blocks A, B, C, D and E move right downward in parallel by (¾ pixel, ¾ pixel), i.e., even in the case of a motion vector MV=(MVx, MVy)= (¾, ¾), the motion vector MV=(MVx, MVy)=(¾, ¾) does not necessarily indicate the "funny position", when the second phase of the predicted motion vector PMV is "2".

MODIFIED EXAMPLE 1B

Description will be made of a modified example 1B of the moving picture encoding device 20 and the moving picture decoding device 50 of the foregoing Embodiment 1. Hereinafter, only differences from the Embodiment 1 will be described.

In the moving picture encoding device 20 and the moving picture decoding device 50 according to the modified example, the motion compensation section 33 of the moving picture encoding device 20 and the motion compensation section 72 of the moving picture decoding device 50 of the foregoing embodiment are changed. The motion compensation section 33 of the moving picture encoding device 20 and the motion compensation section 72 of the moving picture decoding section 50 are identical. Thus, hereinafter, the motion compensation section 33 of the moving picture encoding device 20 will be described.

According to the modified example, the determination section 33d of the motion compensation section 33 determines whether or not a motion vector $MV_E$ of a predetermined area (a macro-block E) to be encoded, which is detected by the motion detection section 32, indicates a "funny position" in accordance with the aforementioned difference information $MVD_E = (MVDx_E, MVDy_E)$. Subsequently, a result of the determination is reported to the predicted picture signal generation section 33e by the determination section 33d.

That is, the determination section 33d constitutes a determination section configured to determine that the motion vector $MV_E$ detected by the motion vector detection section (the motion detection section 32) is a predetermined motion vector (a motion vector indicating the "funny position"), when difference information $MVD_E$ between a motion vector $PMV_E$ predicted by the prediction section (the predicted motion vector calculation section 33c) and the motion vector $MV_E$ detected by the motion vector detection section (the motion detection section 32) is equal to a predetermined value.

Hereinafter, a unit regarding expression of the motion vector $MV_E=(MVx_E, MVy_E)$ is a ¼ pixel.

For example, in the case of "$MVDx_E\%4=3$" and "$MVDy_E\%4=3$", the determination section 33d determines that the motion vector $MV_E$ ($MVx_E$, $MVy_E$) detected by the motion detection section 32 indicates a "funny position".

In such a case, i.e., if a smoothing operation is carried out with a quotient remainder of the difference information $MVD_E$ of the motion vector, it is necessary to change a method of calculating a pixel value in the "funny position".

That is, according to the conventional technology, the foregoing Embodiment 1 and the Modified Example 1, the motion compensation is carried out based on the average of the pixel values of the integer pixel positions which surround the "funny position". However, if determination of the "funny position" is carried out with the quotient remainder of the difference information $MVD_E$ of the motion vector, the "funny position" itself is represented as an integer pixel position, and an integer pixel position for obtaining an average may not be established. Thus, a motion compensation operation is carried out as follows.

Figure 11:
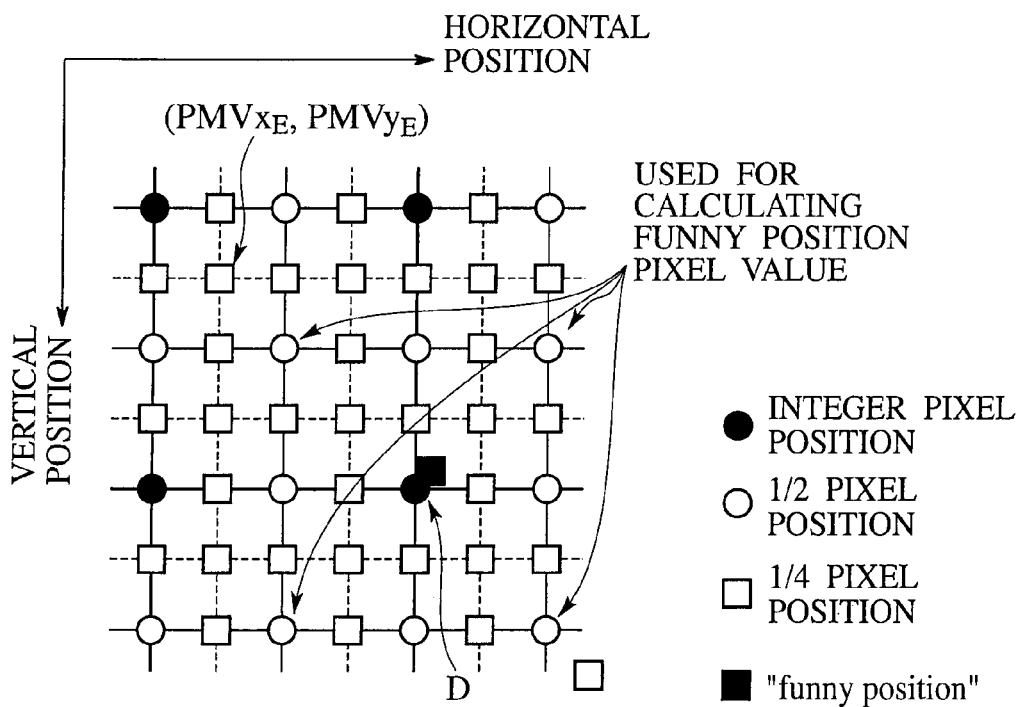
FIG. 11 is a diagram showing a concept for determining a "funny position" in the moving picture encoding device according to the modified example of the invention.

In FIG. 11, because of "$MVDx_E\%4=3$" and "$MVDy_E\%4=3$" (in this case, "$PMVx_E\%4=1$" and "$PMVy_E\%4=1$"), the predicted picture generation section 33e determines that the motion vector $MV_E=(MVx_E, MVy_E)$ detected by the motion detection section 32 indicates the "funny position". Here, in reality, the motion vector $MV_E=(MVx_E, MVy_E)$ indicates an integer pixel position "D".

In such a case, as shown in FIG. 11, the predicted picture generation section 33e causes a motion compensation value of a predetermined area (a macro-block or sub-block) to take on an average of a pixel value of ($MVx_E+2$, $MVy_E+2$), a pixel value of ($MVx_E+2$, $MVy_E-2$), a pixel value of ($MVx_E-2$, $MVy_E+2$) and a pixel value of ($MVx_E-2$, $MVy_E-2$) in the reference frame picture 5.

Instead, the predicted picture generation section 33e may obtain a motion compensation value of the predetermined area (the macro-block or sub-block) to be encoded, exclusively from a pixel value of an integer pixel position in the reference frame picture 5. Specifically, the motion compensation value is caused to take on an average of a pixel value of (($MVx_E/4)\times 4$, ($MVy_E/4)\times 4$), a pixel value of ((($MVx_E+4)/4)\times 4$, ($MVy_E/4)\times 4$), a pixel value of ((($MVx_E/4)\times 4$, (($MVy_E+4)/4)\times 4$) and a pixel value of ((($MVx_E+4)/4)\times 4$, (($MVy_E+4)/4)\times 4$).

According to the Modified Example 1B, in the moving picture encoding device 20, choice can be made between transmission of a real motion vector ($MVx_E$, $MVy_E$) and transmission of a motion vector $MV_E=(MVx_E, MVy_E)=(1, 1)$ for the purpose of executing smoothed motion compensation.

(Embodiment 2)

Description will be made of a moving picture encoding device 20 and a moving picture decoding device 50 according to the Embodiment 2 of the present invention. In the embodiment, no motion compensation which uses a "funny position" is carried out.

The description for the Embodiment 1 has been referred to countermeasures against the problem regarding the transmission of the motion vector MV (or difference information MVD of the motion vector) which indicates the "funny position", i.e., the problem of the obstructed transmission of a real motion vector MV. However, there still remains a possibility that the real motion vector MV can not be transmitted.

Thus, in the present embodiment, description will be made of the moving picture encoding device 20 and the moving picture decoding device 50. The moving picture encoding and decoding devices can carry out motion compensation from reference pictures whose degrees of smoothness are different from one predetermined area to be encoded to another, by separately preparing a predicted picture signal which is strongly smoothed like provided by the "motion compensation value" in the "funny position" of the Embodiment 1 and a predicted picture signal of a normal "motion compensation value" in a position other than the "funny position", and by signaling identification information of these 2 kinds of predicted picture signals together with a reference frame picture number. Thus, the motion compensation can be carried out without using the "funny position".

Figure 12:
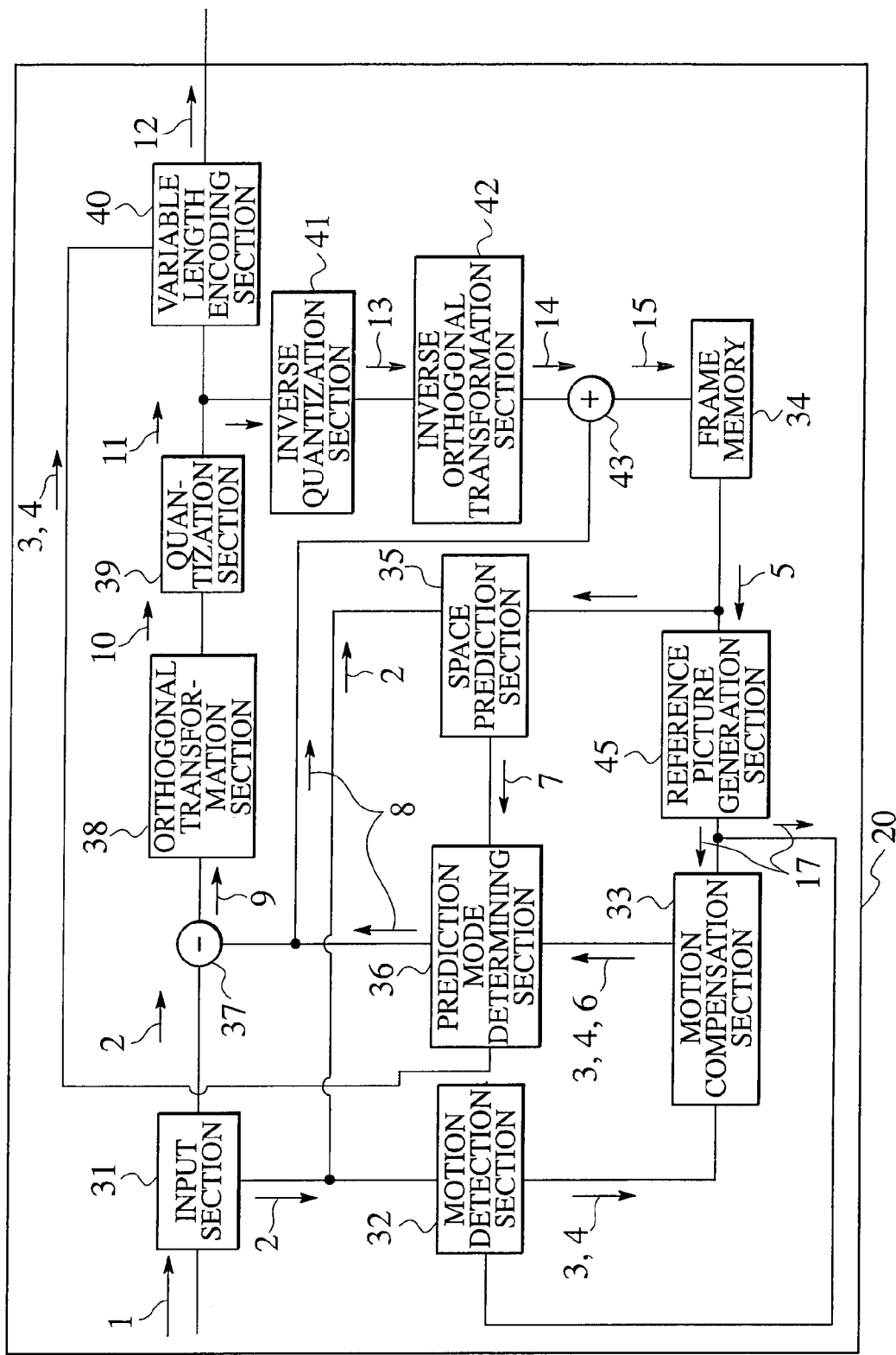
FIG. 12 is a schematic diagram of a moving picture encoding device according to an embodiment of the present invention.
Figure 13:
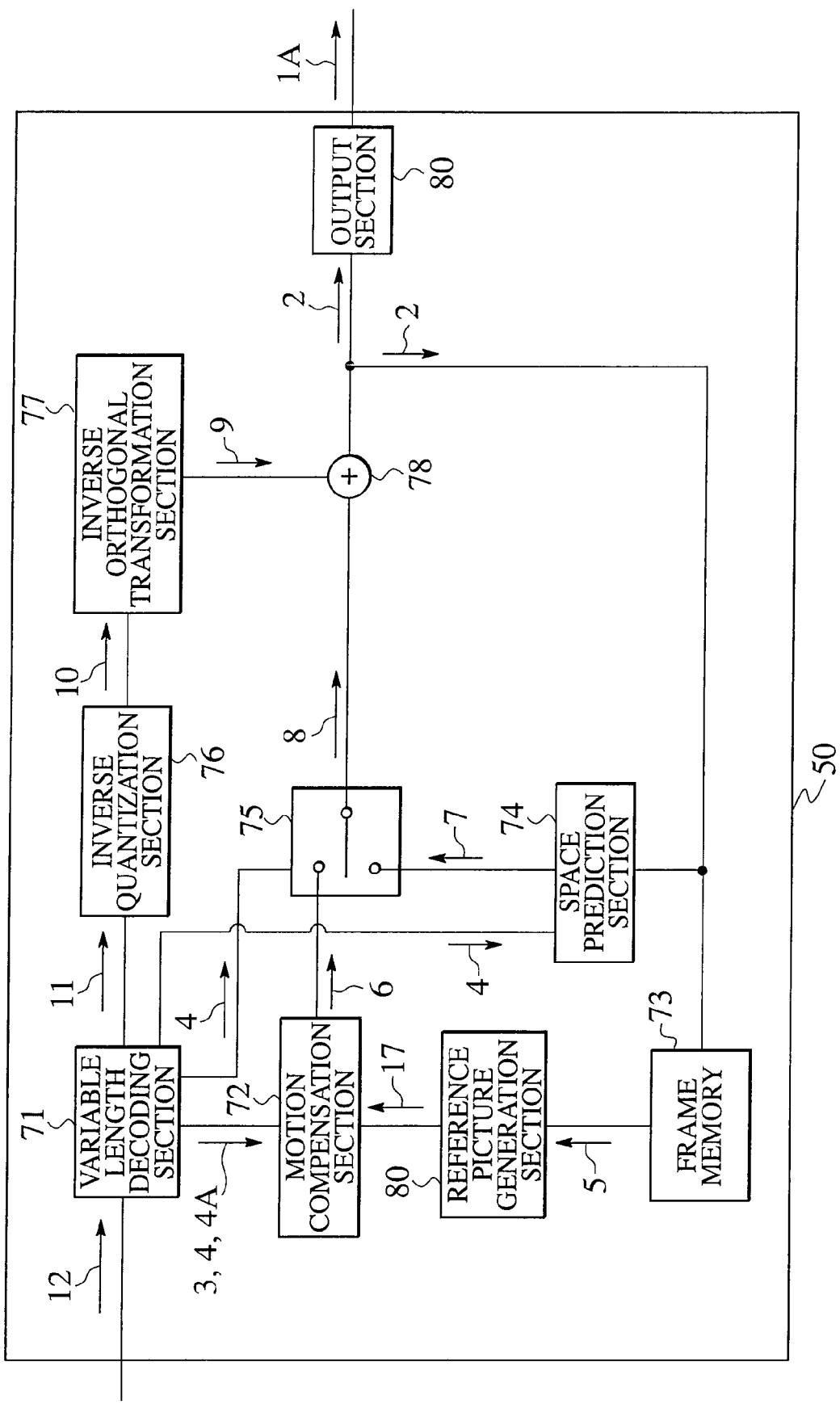
FIG. 13 is a schematic diagram of a moving picture decoding device according to an embodiment of the present invention.

FIG. 12 is a schematic view of the moving picture encoding device 20 of the embodiment, and FIG. 13 is a schematic view of the moving picture decoding device 50.

In this embodiment, as in the case of the Embodiment 1, description will be made of the moving picture encoding device 20 and the moving picture decoding device 50 for which improvements have been introduced in motion compensation in a "funny position" which is a problem in the "H. 26L encoding system" defined by the conventional "TML-8" (a first problem).

In the Embodiment 2, operations are similar to those of the moving picture encoding device 20 and the moving picture decoding device 50 described in the "TML-8", except that the motion compensation is executed from a different reference picture without using "funny positions". Thus, details thereof are omitted, and description will focus on differences.

Basic operations of the moving picture encoding device 20 and the moving picture decoding device 50 according to the present embodiment are virtually the same as those of the moving picture encoding device 20 and the moving picture decoding device 50 according to the conventional technology, except that modifications have been introduced in the configuration of the motion compensation sections 33 and 72 as well as the variable encoding section 40, and except that new reference picture generation sections 45 and 80 have been added.

According to the present embodiment, the reference picture generation sections 45 and 80 are configured to generate a plurality of different reference pictures (normal first reference pictures or second reference pictures of strong smoothing application) 17, by executing a plurality of different picture processing on a reference frame picture 5. Here, as the aforementioned picture processing, processing for changing degrees of smoothness, processing for changing degrees of space resolution, and the like are conceived. In the present embodiment, as picture processing, a case of using processing for changing a degree of smoothness will be described.

Additionally, the motion compensation section 33 is configured to calculate a motion compensation value (a predicted picture signal 6) for a predetermined area (a macro-block) to be encoded, by using the reference picture 17 in place of the reference frame picture 5.

The variable length encoding section 40 constitutes a transmission section configured to transmit a combination of "information (a reference frame code: Ref_frame) regarding the reference picture 17" used for calculating the motion compensation value (the predicted picture signal 6) and "information (a predicted residual signal data encoding syntax: Texture Coding Syntax) indicating the motion compensation value".

Additionally, the variable length decoding section 71 constitutes a decoding section configured to decode the "information (the Ref_frame) regarding the reference picture" used for calculating the motion compensation value in the moving picture encoding device 20, and the "information (the predicted residual signal data encoding syntax) indicating the motion compensation value".

The variable length decoding section 71 transmits a motion vector 3, a prediction mode 4, and a "reference frame code (an Ref_frame)" 4A, to the motion compensation 72.

Further, the motion compensation section 72 is configured to calculate a motion compensation value for a predetermined area (a macro-block) to be encoded, by using the reference picture 17 specified by the "information (the Ref_frame) regarding the reference picture" in place of the reference frame picture 5.

According to the present embodiment, the "information (the reference frame code: Ref_frame) regarding the reference picture 17" is a combination of "identification information (a reference frame picture number) of the reference frame picture" and "information (a first reference picture or second reference picture) indicating a degree of smoothness".

First, according to the present embodiment, the reference picture generation section 45 generates a normal reference picture (hereinafter, referred to as a first reference picture) which has no "funny position". A "motion compensation value" of the first reference picture is equal to a "motion compensation value" in each pixel position of an integer pixel position, a ½ pixel position and a ¼ pixel position of the "TML-8", except that an original "motion compensation value" is used even for a "motion compensation value" in the same position as the "funny position" of the TML-8".

The "motion compensation value" of the first reference picture in the same pixel position as the "funny position" of the "TML-8" is generated as an average of four points of pixel values of a neighboring integer pixel position and a neighboring ½ pixel position as in the case of the "motion compensation value" in a position (¼ pixel, ¼ pixel) other than the "funny position" of the "TML-8".

Second, a reference picture (hereinafter, referred to as a second reference picture) which is strongly smoothed like provided by the "motion compensation value" in the "funny position" of the "TML-8" is generated by using the first reference picture. Here, the second reference picture can be generated by executing picture processing with various kinds of smoothing filers for each pixel value of the first reference picture. For example, the second reference picture having ¼ pixel accuracy can be generated by independently operating 3 tap filters (1, 4, 1)/6 having smoothing effects vertically and horizontally for the pixel value of each pixel position of the first reference picture having ¼ pixel accuracy.

According to the "H. 26L encoding system", a plurality of encoded frame pictures which differ from one another with time are prepared as reference frame pictures 5, and these can be used as reference pictures for motion compensation. Additionally, bits of identification information of these encoded frame pictures which differ from one another with time are discriminated as reference frame picture numbers.

According to the embodiment, identification information of the first reference picture or identification information of the second reference picture, i.e., information of a method of generating a reference picture and the reference frame picture number are combined to be transmitted.

Thus, without using the "funny position", it is possible to carry out motion compensation using reference pictures whose degrees of smoothness are different from one predetermined area (e.g., a macro-block) to be encoded to another.

In this case, for the reference frame pictures 5 which are encoded frame pictures different from one anointer with time, the reference picture generation sections 45 and 80 generate a first and a second reference pictures whose degrees of smoothness are different. Consequently, these reference frame pictures can be used as "reference pictures" for motion compensation in the motion compensation sections 33 and 72.

Figure 14:
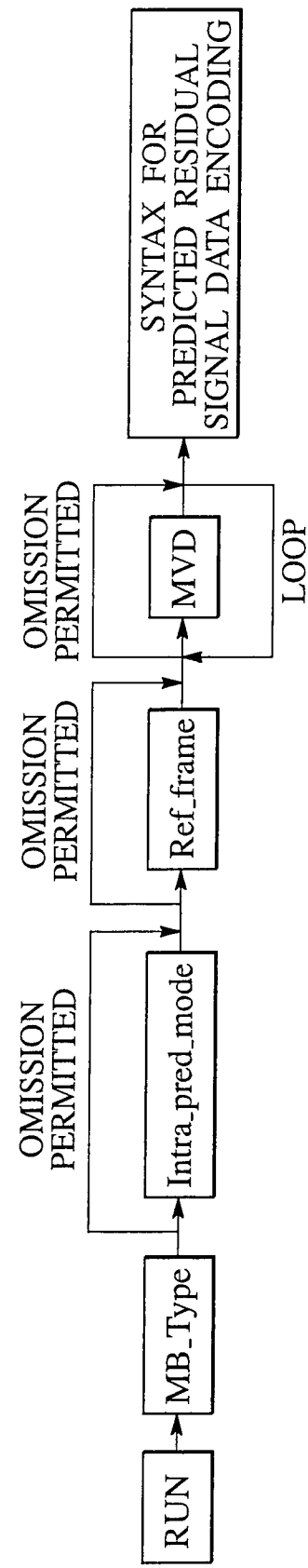
FIG. 14 is a diagram showing an encoding syntax in a macro-block unit in an H. 26L encoding system used in the embodiment of the invention.

FIG. 14 shows an "encoding syntax for each macro-block unit according to the H. 26L encoding system" used in the embodiment. According to the embodiment, there is no variation from the encoding syntax for each macro-block unit of the H. 26L encoding system. However, definition of an "Ref_frame" is changed to a combination of a "reference frame picture number" and "identification information of a method of generating a reference picture", i.e., a "reference frame code".

As shown in FIG. 14, even when a prediction mode (e.g., a mode 7) which requires a plurality of motion vectors to be detected in one macro-block is applied, encoding can be carried out without containing information regarding a plurality of "MB_TYPEs", "Ref_frames" and the like.

That is, by using the encoding syntax, it is possible to repeatedly transmit difference information MVD of a motion vector and a predicted residual signal data encoding syntax (a Texture Coding Syntax), in response to an act of transmitting a "MB_TYPE", a "Ref_frame" or the like. Here, the predicted residual signal data encoding syntax is obtained by subjecting a quantized orthogonal transformation coefficient 11 to variable length encoding.

FIG. 15 shows an example of a reference frame code (an Ref_frame) based on a combination of a reference frame picture number and identification information of a generation method of a reference picture.

Here, as shown in FIG. 15, the same reference frame codes ("0" to "4") as those denoting the reference frame picture numbers of the conventional H. 26L are used for the first reference picture, and newly added reference frame codes ("5" to "9") are used for the second reference picture.

According to the embodiment, the second reference picture is more strongly smoothed than the first reference picture which is a normal reference picture, and the second reference picture is a reference picture which does not have space resolution that an original picture (a reference frame picture 5) has.

Thus, the second reference picture is used, only when encoding distortion is suppressed more when a reference picture of a stronger degree of smoothness is used and motion compensation efficiency is improved. Thus, it is less likely that the second reference picture is chosen, compared with the first reference picture.

In many cases, therefore, the first reference picture which is a normal reference picture is chosen as a reference picture used for motion compensation. A reference frame code table for defining reference frame codes to be transmitted in this case is similar to that for defining reference frame codes (Ref_frames)" of the "H. 26L encoding system" shown in FIG. 16. Thus, compared with the case of the conventional "H. 26L encoding system", there is no increase in a bit amount caused by change of reference frame codes.

Furthermore, in the case of executing motion compensation which uses the second reference picture of a stronger degree of smoothness, a relatively long encoding length is necessary for a reference frame code to be transmitted. However, a probability of using such a second reference picture is not large, and an influence of an increased bit amount of the reference frame code may be small compared with motion compensation efficiency increased by using the second reference picture of a strong degree of smoothness. Thus, highly efficient encoding can be expected.

Operations/Effects of the Moving Picture Encoding and Decoding Devices According to the Embodiment 2

According to the moving picture encoding device 20 of the present invention, by using two kinds of reference pictures of different degrees of smoothness, i.e., a normal reference picture (a first reference picture) formed by the reference picture generation section 45 and a reference picture (a second reference picture) of a strong degree of smoothness, it is possible to carry out motion compensation using a reference picture of a degree of smoothness different from one predetermined area (e.g., a macro-block) to be encoded to another.

Additionally, according to the moving picture encoding device 20 of the invention, a degree of smoothness for the reference picture can be signaled by generating a reference frame code through combining the "identification information of the method of generating the reference picture" with the "reference frame picture number". Accordingly, it is possible to solve the problem that strong smoothing is always applied to the "motion compensation value" in the area having a motion vector which indicates the same pixel position as the "funny position" as in the case of the "H. 26L encoding system".

The filter of the present embodiment for generating the second reference picture which is a reference picture of a strong degree of smoothness is only an example. By applying a filter for processing other than smoothing, it is possible to realize prediction based on a reference picture of a different nature.

Additionally, in FIG. 11, to simplify explanation, the maximum number of reference frame pictures used for reference picture generation is "5". However, the present invention is not limited to this number, and a maximum number of reference frame pictures can be optionally set.

According to the "TML-8", the maximum number of reference frame pictures used for reference picture generation is given as known in the moving picture encoding device 20 and the moving picture decoding device 50.

Further, in real application, the maximum number of reference frame pictures may be decided by such a method or based on information of the compressed stream 12 sent from the moving picture encoding device 20 to the moving picture decoding device 50.

In any of the cases, the maximum number of reference frame pictures used for reference picture generation is uniquely determined in the moving picture encoding device 20 and the moving picture decoding device 50. Thus, a reference frame code table can be uniquely determined in accordance with the maximum number of reference frame pictures used for reference picture generation.

Further, in the reference frame code table for defining reference frame codes (Ref_frames) in FIG. 16, a "reference frame code (an Ref_frame)" which is a combination of the "reference frame picture number" and the "second reference picture" is allocated after a "reference frame code (an Ref_frame)" which is a combination of the "reference frame picture number" and the "first reference picture". However, based on the assumption that reference pictures close together with time for motion compensation are frequently used, those of smaller reference frame picture numbers among second reference pictures of strong degrees of smoothness can be arranged higher in place on the reference frame code table.

Additionally, the reference frame code table may be determined uniquely in accordance with the encoding conditions of the predetermined area (the macro-block) to be encoded as described above. Or the reference frame code may be changed dynamically in accordance with the aforementioned encoding conditions. Here, for the aforementioned encoding conditions, a prediction mode (i.e., kind of a unit for detecting the motion vector), the quantization step (the QP value) and the like are conceivable. Here, for the kind of the unit for detecting the motion vector, for example, a size of a sub-block for detecting the motion vector and the like is conceived.

As a specific example, a case of dynamically changing the reference frame code in accordance with the quantization step will be described. Here, the second reference picture of a strong degree of smoothness may be frequently used, when low bit rate encoding is applied. Accordingly, if the quantization step is equal to or lower than a predetermined threshold value, the "reference frame code" containing the "second reference picture" is arranged lower on the reference frame code table. If the quantization step exceeds the predetermined threshold value, some "reference codes" containing "second reference pictures" are arranged upper on the reference frame code table.

As described above, the "reference frame code table" for defining the "reference frame code" which is a combination of the "reference frame picture number" and the "identification information of the method of generating the reference picture" shown in FIG. 15 is only an example. It is possible to use an given reference frame code table necessary for realizing switching, to be executed according to the embodiment, between the "reference frame picture number" and the "identification information of the method of generating the reference picture".

Additionally, according to the present embodiment, the degree of smoothness of the reference picture may be automatically switched to be uniquely determined in accordance with the encoding conditions of the predetermined area (the macro-block) to be encoded, in place of the explicit signaling of the degree of smoothness of the reference picture used for the motion compensation by using the reference frame code (the Ref_frame).

That is, the reference picture generation section 45 may generate a reference picture 17 of a predetermined degree of smoothness, in accordance with the encoding conditions (units for detecting the motion vector, quantization steps and the like) of the predetermined area (the macro-block) to be encoded.

For example, complex motion may occur in an area encoded by a "macro-block mode (an MB_Type: a prediction mode)" in which the predetermined area (the macro-block) to be encoded is finely divided, and accordingly the reference picture used for motion compensation may not need high pixel value accuracy.

Further, in the macro-block of a large quantization step (a QP value), the reference picture used of motion compensation may not need high pixel value accuracy.

Thus, with regard to the macro-block in which the number of units (sub-blocks) for detecting the motion vector or the quantization step exceeds a predetermined threshold value, the second reference picture of a strong degree of smoothness may always be used.

In such a case, since the reference picture to be generated is uniquely decided in accordance with the encoding conditions, no information for identifying a degree of smoothness by using the reference frame picture number is necessary. Thus, compared with the "H. 26L encoding system", there is no increase in a bit amount caused by changing of reference frame codes or macro-block mode codes.

MODIFIED EXAMPLE 2A

Modified Example 2A of the foregoing Embodiment 2 will be described. Hereinafter, differences between the present embodiment and Embodiment 2 will be described.

According to the foregoing Embodiment 2, the reference pictures (first and second reference pictures) 17 of two different kinds of generation methods (degrees of smoothness) are formed. Subsequently, the formed "identification information (information indicating a degree of smoothness) of the method of generating the reference picture" and "the reference frame picture number (identification information of the reference frame picture)" are combined to generate the "reference frame code (the information regarding the reference picture)". Thus, the motion compensation can be carried out by using the reference picture whose degree of smoothness is changed from one predetermined area (a macro-block) to be encoded to another.

However, the switching of degrees of smoothness has been possible only by the macro-block unit which is a unit for allocating the reference frame picture number.

Thus, in the modified example, description will be made of a moving picture encoding device 20 and a moving picture decoding device 50 which can transmit a combination of "reference frame code" and a "sub-block unit (a unit for detecting a motion vector)". The "reference frame code" is generated by combining a reference frame picture number with identification information of a method of generating a reference picture. The sub-block is part of a macro-block in which the motion compensation is executed.

Basic operations of the moving picture encoding and decoding devices 20 and 50 according to the modified example is virtually the same as those of the moving picture encoding and decoding devices 20 and 50 according to the foregoing Embodiment 2.

According to the modified example, a motion compensation section 33 switches reference pictures (a first reference picture or a second reference picture) 17 used for calculating a motion compensation value by a unit (a sub-block unit) for detecting a motion vector.

A variable length encoding section 40 transmits a combination of "information regarding reference pictures (Ref_frames)" and "information indicating motion compensation value (a predicted residual signal data encoding syntax)" by a unit (a sub-block unit) for detecting a motion vector.

Additionally, a variable length decoding section 71 decodes "information regarding reference pictures (reference frame codes)" and "information indicating motion compensation value (a predicted residual signal data encoding syntax)" by a unit (a sub-block unit) for detecting a motion vector.

Further, a motion compensation section 72 switches the reference pictures 17 used for calculating the motion compensation value by a unit (a sub-block unit) for detecting a motion vector.

Here, as an example of a "reference code (an Ref_frame)" based on a combination of a "reference frame picture number" and "identification information of a method of generating a reference picture," a code similar to that of the Embodiment 2 is assumed.

Figure 17:
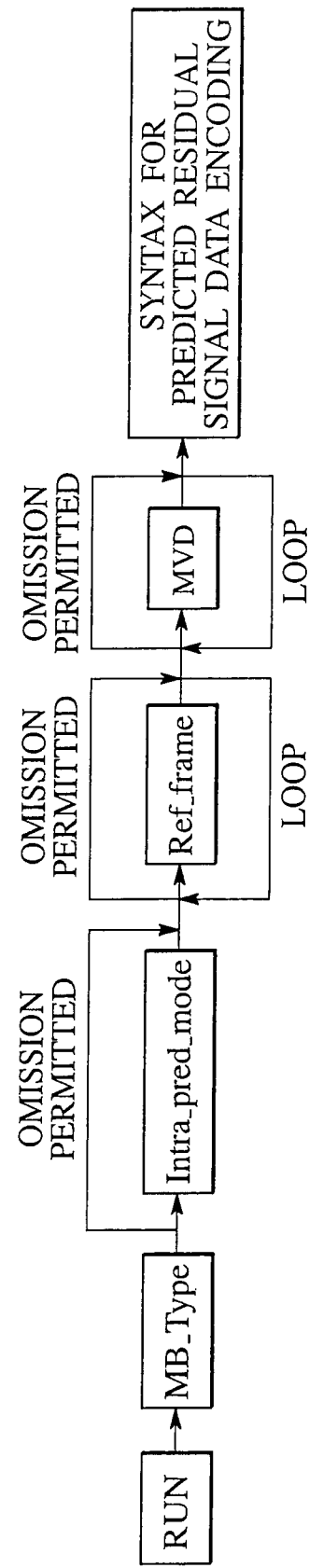
FIG. 17 is a diagram showing an encoding syntax in a macro-block unit in an H. 26L encoding system used in a modified example of the present invention.

FIG. 17 shows an encoding syntax based on a macro-block unit according to the modified example.

According to the modified example, in the macro-block, a need arises to transmit the "reference frame code (the Ref_frame)" generated by combining the "reference frame picture number" and the "identification information of the generation method of the reference picture" by a sub-block unit by a plurality of times.

The number of "reference frame codes (Ref_frames)" can be notified by a "macro-block type (an MB_type)", because a type and the number of a sub-block are transmitted by the "macro-block type (the MB_type)".

For example, if a macro-block type is an "INTER prediction mode (a mode 7)", the number of "reference frame codes (Ref_frames)" to be transmitted is "16".

According to the modified example, in the "sub-block" unit which is a unit for detecting a motion vector in the macro-block, it is possible to carry out motion compensation by using the reference picture 17 of a different degree of smoothness.

Additionally, it is possible to carry out motion compensation which uses a reference frame picture 5 different from sub-block to sub-block. Accordingly, motion compensation of a higher degree of freedom can be carried out in response to a shape and motion of a frame picture signal 2.

Furthermore, according to the modified example, the degree of smoothness of the reference picture may be automatically switched to be uniquely determined in accordance with the encoding conditions of the predetermined area (a macro-block or a sub-block) for detecting a motion vector, in place of the explicit signaling of the degree of smoothness of the reference picture used for the motion compensation by using the reference frame code (the Ref_frame).

MODIFIED EXAMPLE 2B

The Modified Example 2 of the Embodiment 2 will be described. Except for motion compensation executed by using a different reference picture 17 without using a "funny position", operations of the moving picture encoding device 20 and the moving picture decoding device 50 according to the present embodiment are similar to those of the moving picture encoding device 20 and the moving picture decoding device 50 described in the "TML-8". Thus, details thereof are omitted, and description will focus on differences.

According to the foregoing Embodiment 2, the reference pictures (first and second reference pictures) of two different kinds of generation methods (degrees of smoothness) are formed. Subsequently, the formed "identification information of the generation method of the reference picture" and "the reference frame picture number" are combined to generate the "reference frame code". Thus, the motion compensation in which degrees of smoothness is changed from one predetermined area (e.g., a macro-block: a unit for allocating a reference frame picture number) to be encoded to another can be carried out.

According to the modified example, two kinds of reference pictures (first and second reference pictures) of different degrees of smoothness are formed, and the formed "identification information of the generation method of the reference picture" and a "macro-block mode" are combined to generate a "macro-block mode code". Thus, it is possible to carry out motion compensation whose degrees of smoothness are changed from one predetermined area (a macro-block) to be encoded to another.

Basic operations of the moving picture encoding device 20 and the moving picture decoding devices 50 according to the modified example are virtually the same as those of the moving picture encoding device 20 and the moving picture decoding devices 50 according to the foregoing Embodiment 2.

According to the modified example, "information regarding a reference picture (a macro-block mode code)" is a combination of "identification information indicating a unit for detecting a motion vector (a macro-block mode: MB_Type)" and "information indicating a degree of smoothness (a first reference picture or second reference picture)".

A variable length encoding section 40 transmits a combination of "information regarding reference picture (macro-block mode codes)", "identification information of reference frame pictures (a reference frame picture number: an Ref_frame)" and "information indicating motion compensation value (a predicted residual signal data encoding syntax)", by a unit of a predetermined area (a macro-block unit) to be encoded.

Additionally, a variable length decoding section 71 decodes "information regarding reference pictures (macro-block mode codes: MB_Types)", "identification information of reference frame pictures (a reference frame picture number: an Ref_frame)" and "an information predicted residual signal data encoding syntax indicating motion compensation value", by a unit of a predetermined area (a macro-block) to be encoded.

Further, a motion compensation section 72 uses a reference picture 17 specified by "information regarding a reference picture (an MB_Type)" and "identification information of a reference frame picture (an Ref_frame)" in place of a reference frame picture 5, so as to calculate a motion compensation value for the predetermined area (the macro-block) to be encoded.

FIG. 14 shows an encoding syntax based on a macro-block unit according to the H. 26L encoding system. According to the modified example, there is no change from the conventional "encoding syntax by the macro-block unit of the H. 26L encoding system". However, definition of a "macro-block mode" (an MB_Type)" is changed to be expressed by a combination of a "macro-block mode" and "identification method of a generation method of a reference picture".

FIG. 18 shows an example of a "macro-block mode code (an MB_type)" based on a combination of a "macro-block mode" and "identification information of a method of generating a reference picture".

As shown in FIG. 18, with regard to the same macro-block mode as the macro-block mode of the conventional H. 26L, execution of motion compensation is instructed from a first reference picture. With regard to a newly added macro-block mode, execution of motion compensation is instructed from a second reference picture of a strong degree of smoothness.

According to the modified example, since the macro-block mode is allocated to a macro-block unit, it is possible to carry out motion compensation from a reference picture of a different degree of smoothness by a macro-block unit.

Furthermore, according to the modified example, the degree of smoothness of the reference picture may be automatically switched to be uniquely determined in accordance with the encoding conditions of an area (a macro-block) to be encoded, in place of the explicit signaling of the degree of smoothness of the reference picture used for the motion compensation by using the macro-block mode code (the MB_Type).

MODIFIED EXAMPLE 2C

The Modified Example 2C of the foregoing Embodiment 2 will be described. According to the modified example, the second reference picture of the forgoing Embodiment 2 is subjected to strong smoothing, and a motion vector of the same accuracy as that of the first reference picture is not always necessary in motion compensation. Thus, description will be made of a configuration in which accuracy of a motion vector is changed when the second reference picture is used. Hereinafter, differences between the modified example and the foregoing embodiment 2 will be described.

According to the modified example, when a reference picture (a second reference picture) of a strong degree of smoothness is used, a motion compensation section 33 reduces accuracy of a motion vector used for calculating a motion compensation value (a predicted picture signal 6). Specifically, in such a case, the motion compensation section 33 is configured to reduce accuracy of horizontal and vertical elements of the motion vector.

According to the modified example, as in the case of the foregoing Embodiment 2, a reference picture generation section 45 generates a reference picture subjected to strong smoothing as a second reference picture in which space resolution is reduced to ½ pixel accuracy or integer pixel accuracy, after generating a first reference picture.

As an example of a method of generating a reference picture subjected to strong smoothing in a second reference picture in which space resolution is ½ pixel accuracy, a method of down-sampling by operating a (1, 2, 1)/4 filter on a first reference picture will be described.

Additionally, as an example of a method of generating a reference picture subjected to strong smoothing in which space resolution is integer pixel accuracy, a method of down-sampling by operating a (1, 2, 1)/4 filter on the smoothed picture of ½ pixel accuracy will be described.

According to the modified example, as an example of a "reference frame code" based on a combination of a "reference frame picture number" and "identification information of a method of generating a reference picture", a code similar to that of the foregoing Embodiment 2 is assumed.

For example, when a strongly smoothed reference picture whose space resolution is reduced to ½ pixel accuracy is generated as a second reference picture, the following substitution is carried out in a motion vector of the second reference picture assuming that a motion vector of a first reference picture is (MVx, MVy).

Pixel position of the first reference picture:
MVx, MVy (a unit is ¼ pixel)
Pixel position of the second reference picture:
MVx//2, MVy//2
Here, "//" represents integer division which accompanies a rounding operation in a zero direction.

Additionally, if a strongly smoothed reference picture whose space resolution is reduced to integer pixel accuracy is generated as a second reference picture, the following substitution is carried out in a motion vector of the second reference picture assuming that a motion vector of a first reference picture is (MVx, MVy).

Pixel position of the first reference picture:
MVx, MVy (a unit is ¼ pixel)
Pixel position of the second reference picture:
MVx//4, MVy//4
Here, "//" represents integer division which accompanies a rounding operation in a zero direction.

Thus, the second reference picture has a plurality of values for the same motion vector MV=(MVx, MVy).

For example, if the second reference picture is reduced to ½ pixel accuracy, (3, 3), (2, 3), (3, 2) and (2, 2) indicate the same motion vector.

Therefore, in the second reference picture, when encoding is executed at the variable length encoding section 40, a motion vector (e.g., (2, 2)) in which a generated encoding amount is small may be sent as a representative.

Instead, in the second reference picture, difference information MVD between a predicted motion vector PMV and a motion vector may be calculated by using a motion vector after substitution is executed in accordance with space resolution, and a value of the difference information of the motion vector to be sent may be reduced. In other words, an encoding amount may be reduced.

In this case, if the difference information MVD between the predicted motion vector and the motion vector is calculated from the second reference picture to the first reference picture of large space resolution, substitution is inversely carried out to increase the space resolution of the motion vector MV of the second reference picture.

By the aforementioned change, if noise is superimposed on the reference frame picture 5, efficient encoding can be expected by referring to the second reference picture of low space resolution.

Additionally, the modified example is characterized in that in the second reference picture of low space resolution, the space resolution of the motion vector is reduced, and redundancy at the time of motion vector encoding is avoided.

Furthermore, according to the modified example, the space resolution of the reference picture may be automatically switched to be uniquely determined in accordance with the encoding conditions of an area (a macro-block) to be encoded, in place of the explicit signaling of the space resolution of the reference picture used for the motion compensation by using the reference frame code (the Ref_frame).

For example, in an area encoded with a "macro-block mode (an MB_Type: a prediction mode)" in which the predetermined area (the macro-block) to be encoded is finely divided, complex motion may occur, and accordingly the reference picture used for motion compensation may not need high pixel value accuracy.

Additionally, in a macro-block of a large quantization step (a QP value), the reference picture used for motion compensation may not need high pixel value accuracy.

Thus, with regard to the macro-block in which the number of units (sub-blocks) for detecting a motion vector or the quantization step exceeds a predetermined threshold value, a second reference picture of strong smoothing (i.e., low space resolution) may always be used.

In such a case, since the generated reference picture is uniquely determined in accordance with the encoding conditions, no information for identifying a degree of smoothness by using a reference frame picture number is necessary. Accordingly, compared with the "H. 26L encoding system", there is no increase in a bit amount caused by a change of a reference frame code or a macro-block mode code.

Further, the degree of smoothness and the space resolution can be automatically switched to be uniquely determined in accordance with the aforementioned encoding conditions (macro-block modes, quantization steps or the like).

In such a case, with regard to the macro-block in which the divided number of sub-blocks or the quantization step exceeds a predetermined threshold value, an encoding amount of the generated motion vector is reduced, by reducing space resolution to ½ pixel accuracy or integer pixel accuracy, by always utilizing a reference picture which uses a filer to apply a strong degree of smoothness, and by decreasing pixel accuracy of horizontal and vertical elements of the motion vector.

(Embodiment 3)

Description will be made of a moving picture encoding device 20 and a moving picture decoding device 50 according to the Embodiment 3. Description of the Embodiment 2 has referred to the moving picture encoding device 20 and the moving picture decoding device 50. The moving picture encoding and decoding devices enable motion compensation to be executed by using the normal reference picture (the first picture information) and the strongly smoothed reference picture (the second picture information) for each predetermined area (the macro-block) to be encoded, by signaling the "information regarding a reference picture (the reference frame code or macro-block mode code)" which is a combination of the "identification information of a method of generating the reference picture (the first reference picture or second reference picture)" and the "reference frame picture number".

In the present embodiment, description will be made of the moving picture encoding device 20 and the moving picture decoding device 50 which constitute a pyramid of layers for each space resolution, so as to enable reference pictures having three kinds of different pixel accuracy to be generated.

Figure 19:
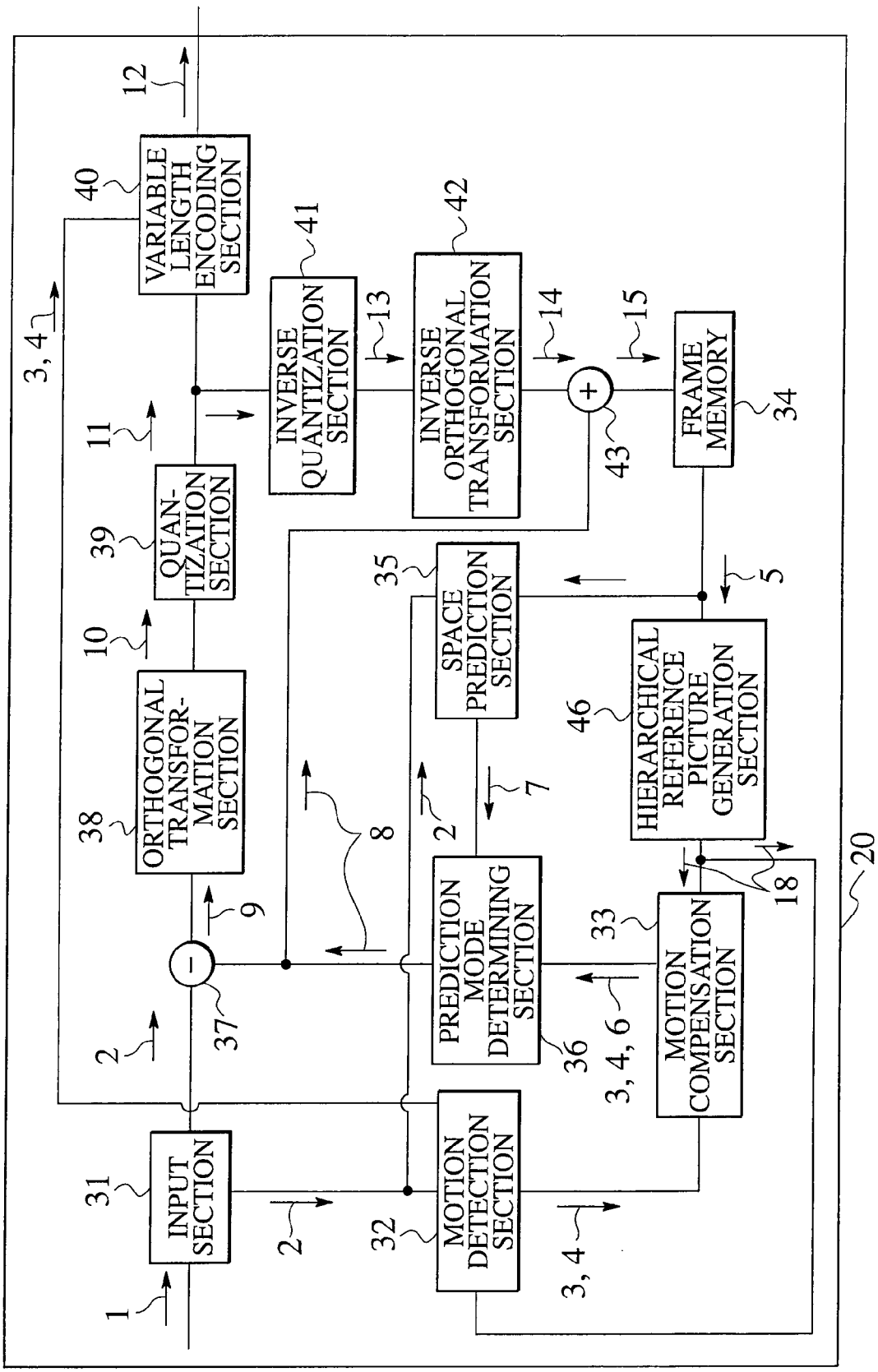
FIG. 19 is a schematic diagram of a moving picture encoding device according to an embodiment of the present invention.
Figure 20:
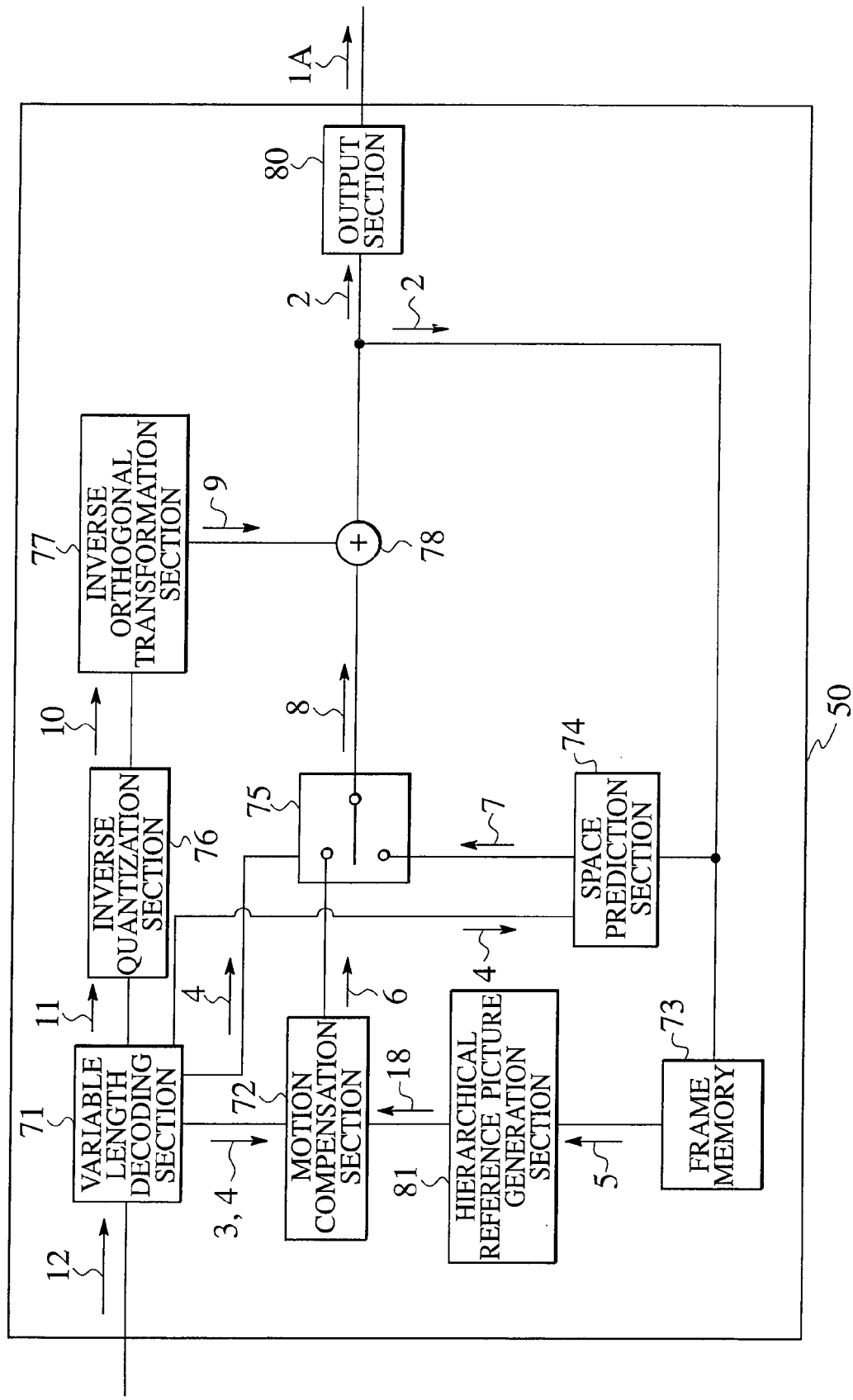
FIG. 20 is a schematic diagram of a moving picture decoding device according to the embodiment of the present invention.

FIG. 19 shows a schematic configuration of the moving picture encoding device 20 of the embodiment, and FIG. 20 shows a schematic configuration of the moving picture decoding device 50.

Basic operations of the moving picture encoding device 20 and the moving picture decoding device 50 according to the present embodiment is virtually the same as those of the moving picture encoding device 20 and the moving picture decoding device 50 according to the conventional technology, except that modifications have been introduced in configuration of the motion detection section 32, the motion compensation sections 33 and 72 as well as the variable length encoding section 40, and except that hierarchical reference picture generation sections 46 and 81 have been added.

According to the present embodiment, each of the hierarchical reference picture generation sections 46 and 81 constitutes a reference picture generation section configured to generate a plurality of different reference pictures (hierarchical reference pictures 18), by executing a plurality of different picture processing on a reference frame picture 15. Here, as the aforementioned picture processing, processing for changing degrees of smoothness, processing for changing space resolution, and the like are conceived. Description of the embodiment will refer to the processing for changing the space resolution is used as the aforementioned picture processing.

Additionally, each of the hierarchical reference picture generation sections 46 and 81 generates a reference picture (a hierarchical reference picture 18) having a plurality of space resolutions by executing filtering through a filter which has a plurality of different pass bands. Here, "information indicating picture processing, i.e., information indicating space resolution (layer)" is an identifier of the filter.

Further, the motion detection section 32 constitutes a 3-dimensional motion vector generation section configured to generate a "3-dimensional motion vector (Layer, MVx, MVy)" by correlating a "motion vector (MVx, MVy)" detected by using the reference picture (the hierarchical reference picture 18) with "information indicating space resolution of the reference picture (the hierarchical reference picture 18) (Layer)".

The motion detection section 32 may be configured to reduce accuracy of the 3-dimensional motion vector for a reference picture of low space resolution (e.g., a layer 3 or the like).

Additionally, the motion compensation section 33 (72) is configured to calculate a motion compensation value for a predetermined area (a macro-block) to be encoded (decoded), by using the reference picture (the hierarchical reference picture 18) in place of the reference frame picture 5.

Further, the motion compensation section 33 constitutes a 3-dimensional motion vector prediction section configured to predict a 3-dimensional motion vector, by using a correlation (e.g., a switching of a context in arithmetic encoding) between an encoded predetermined area (an encoded macro-block) in a frame picture and the predetermined area to be encoded (the macro-block to be encoded).

The variable length encoding section 40 constitutes a transmission section configured to transmit a combination of the "3-dimensional motion vector" and "information indicating a motion compensation value".

Incidentally, the variable length encoding section 40 may transmit a combination of difference information (Layer D, MVDx, MVDy) between the 3-dimensional motion vector (Layer, MVx, MVy) generated by the motion detection section 32 and a 3-dimensional motion vector (Player, PMVx, PMVy) predicted by the motion compensation section 33, and information indicating a motion compensation value.

Additionally, the variable length decoding section 71 constitutes a decoding section configured to decode a 3-dimensional motion vector of a predetermined area to be decoded.

First, a concept used in the present embodiment will be described with reference to FIGS. 21 and 22.

Each of the hierarchical reference picture generation sections 46 and 81 generates 3 layers for the reference frame picture 5 used for the motion compensation by each of the motion compensation sections 33 and 72.

Figure 21:
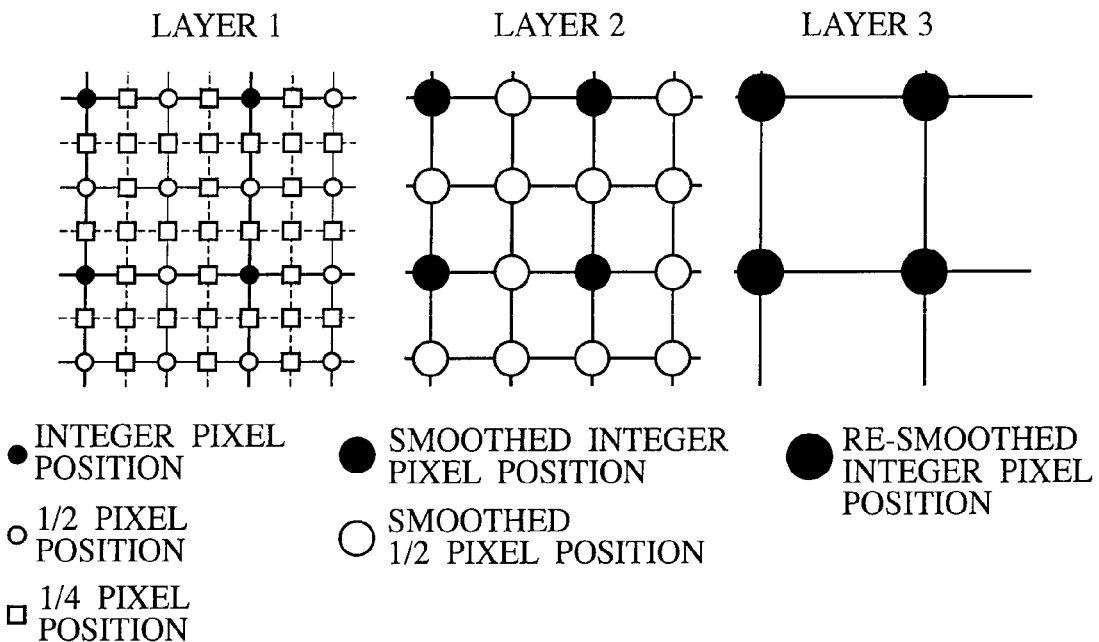
FIG. 21 is a diagram explaining hierarchical reference pictures according to the embodiment of the invention.
Figure 22:
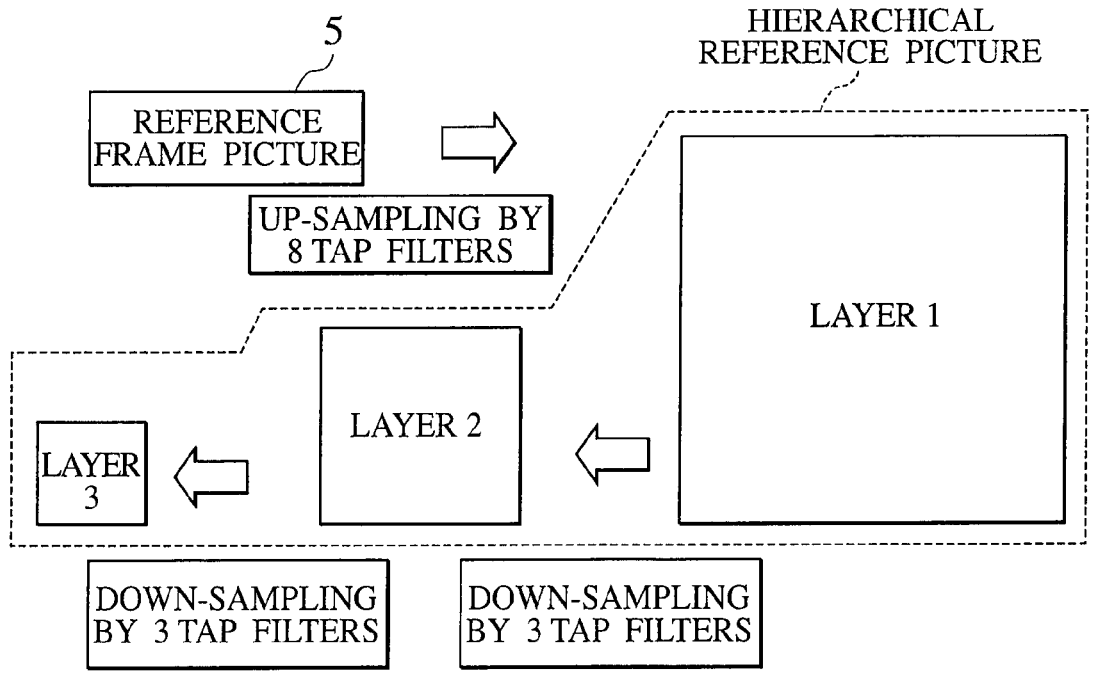
FIG. 22 is a diagram explaining a method for generating the hierarchical reference pictures according to the embodiment of the invention.

First, as shown in FIGS. 21 and 22, each of the hierarchical reference picture generation sections 46 and 81 subjects the reference frame picture 5 to up-sampling by 8 tap filers, so as to generate a layer 1 of ¼ pixel accuracy which is one of hierarchical reference pictures 18. Examples of the 8 tap filters used here are as follows:

for ¼ pixel position:
(−3, 12, −37, 229, 71, −21, 6, −1)/256
for 2/4 pixel position:
(−3, 12, −39, 158, 158, −39, 12, −3)/256
for ¾ pixel position:
(−1, 6, −21, 71, 229, −37, 12, −3)/256

Here, with regard to a pixel value of an integer pixel position, a pixel value of the same position of the reference frame picture 5 is copied. Pixel values of the ¼ pixel position, the 2/4 pixel position and the ¾ pixel position between integer pixel positions are found by multiplication and summation of the aforementioned filter coefficients for the pixel value of the integer pixel position. This filter processing is carried out separately in horizontal and vertical directions.

The filtering processing is described in an up-sampling operation of ⅛ pixel accuracy of the conventional "TML-8", and thus details thereof are omitted.

Second, each of the hierarchical reference picture generation sections 46 and 81 subjects the generated layer 1 of ¼ pixel accuracy to down-sampling by 3 tap filters (low pass band type filters), so as to generate a layer 2 of ½ pixel accuracy which is one of hierarchical reference pictures 18. An example of the 3 tap filters used here is "(1, 2, 1)/4."

Third, each of the hierarchical reference picture generation sections 46 and 81 subjects the generated layer 2 of ½ pixel accuracy to down-sampling by the 3 tap filters, so as to generate a layer 3 of integer pixel accuracy which is one of hierarchical reference pictures 18. The 3 tap filers used here are the same as those which have been previously used.

Noted that the layer 1 has ¼ pixel accuracy as in the case of the conventional technology, but a pixel value of the ¼ pixel position is calculated not by linear interpolation but by executing the aforementioned filter processing so as to maintain space resolution of an original picture (an reference frame picture 5).

As described above, each of the hierarchical reference picture generation sections 46 and 81 generates reference pictures (layer 1 to layer 3) having a plurality of space resolutions through filter processing by the filter having the plurality of different bass bands.

According to the present embodiment, the motion compensation section 33 executes motion compensation by using the hierarchical reference picture 18 generated in the foregoing manner.

In this event, a motion vector 3 is not a group of 2 terms (a 2-dimensional motion vector) of (MVx, MVy) but a group of 3 terms (a 3-dimensional motion vector) of (Layer, MVx, MVy).

The motion detection section 32 detects the 3-dimensional motion vector (Layer, MVx, MVy) in place of the 2-dimensional motion vector (MVx, MVy).

The layer 2 has space resolution half of that of the layer 1, and further the layer 3 has space resolution half of that of the layer 2. Thus, the following substitution is carried out.

Pixel position of layer 1: MVx, MVy (a unit is ¼ pixel)
Pixel position of layer 2: MVx//2, MVy//2
Pixel position of layer 3: MVx//4, MVy//4

Here, "//" represents integer division accompanied by a rounding operation in a zero direction.

Thus, the layers 2 and 3 have a plurality of values (MVx, MVy) for the same motion vector.

For example, in the layers 2 and 3, (2, 3, 3), (2, 2, 3), (2, 2, 3) and (2, 2, 2) indicate the same motion vector.

Therefore, in the upper layer (a layer 2 or layer 3), when encoding is executed at the variable length encoding section 40, a motion vector of a small amount of encoding (e.g., (2, 2, 2) in the aforementioned case) may be sent as a representative.

Instead, in the layers 2 and 3, difference information MVD between a predicted motion vector PMV and a motion vector may be calculated by using the motion vector after substitution in accordance with space resolution of each layer, and a value of the difference information MVD of the motion vector to be sent may be reduced. That is, an amount of encoding may be reduced.

In this case, when the difference information MVD between the predicted motion vector PMV of the motion vector of large space resolution of the layer 1 and the motion vector is calculated from such a layer, substitution is conversely executed to increase the space resolution of the motion vector of each layer.

By using the above concept, as shown in FIG. 23, the predicted motion vector calculation section 33c of the motion compensation section 22 predicts a 3-dimensional motion vector expanded to a plurality of space resolutions, by a method that is virtually the same as that of the foregoing Embodiment 1.

In FIG. 23, a "$PMVx_E$" denotes a horizontal element of a predicted motion vector $PMV_E$ for a predetermined area (a macro-block) E to be encoded, and a "$PMVy_E$" denotes a vertical element of the predicted motion vector $PMV_E$ for the predetermined area (the macro-block) E to be encoded.

A "$Player_E$" indicates predicted space resolution of the predicted area (the macro-block) E to be encoded.

Each of the "$MVDx_E$" and the "$MVDy_E$" indicates difference information of a motion vector of ¼ pixel accuracy for the predetermined area (the macro-block) E to be encoded. A "LayerD" indicates difference information of space resolution for the predetermined area (the macro-block) E to be encoded.

Thus, encoding processing is carried out for a group of 3 terms of (LayerD, MVDx, MVDy).

Incidentally, the motion compensation section 33 may predict a 3-dimensional motion vector of a predetermined area (a macro-block) to be encoded, by using the 3-dimensional motion vector of the encoded predetermined area (the macro-block) in the frame picture signal 2, calculate difference information between the predicted 3-dimensional motion vector and the 3-dimensional motion vector detected by the motion vector detection section 32, and execute motion compensation by using the calculated difference information of the 3-dimensional motion vector.

Here, it is normally predicted if the LayerD focuses on zero, and its transition is asymmetrical when seen from the layer 1 or the layer 3.

Thus, according to the present embodiment, "adaptive arithmetic encoding" realized in the conventional technology may be used, and further expansion in which 3 states of a context model of Player are added may be executed so as to use a correlation with a macro-block of a neighboring area.

As described above, for the Layer, it is possible to carry out encoding which uses the correlation with the macro-block of the neighboring area.

In the foregoing description, the predicted difference encoding which uses the Player and the LayerD is carried out. However, the execution of the predicted difference encoding is identical to execution of context modeling.

Thus, by using the correlation with the macro-block of the neighboring area directly or by using an intermediate value such as Player (using context switching) as a context model, not the LayerD but the Layer itself may be encoded by using arithmetic encoding.

Incidentally, since a concept and details of the "adaptive arithmetic encoding" are heretofore described as "Context-based Adaptive Binary Arithmetic Coding", details thereof are omitted.

Similarly to the foregoing Embodiments 1 and 2 and the modified examples thereof, the present invention has referred to the new motion compensation in which the "2-dimensional motion vector" is expanded as the "3-dimensional motion vector" which contains the "information (Layer) indicating the picture processing (space resolution)", instead of transmitting the "2-dimensional motion vector" and the "information indicating picture processing (information indicating space resolution)".

Figure 24:
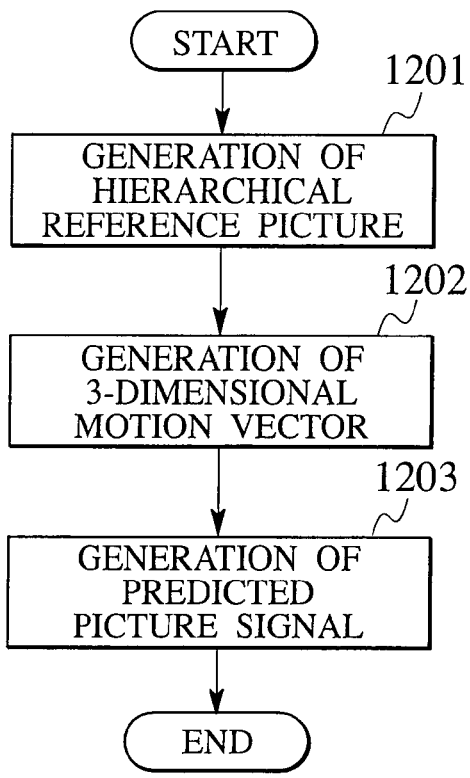
FIG. 24 is a flowchart showing a motion compensation operation in the moving picture encoding device according to the embodiment of the invention.

By referring to FIG. 24, description will be made of a motion compensation operation in the moving picture encoding device 20 of the present embodiment.

In step 1201, the hierarchical reference picture generation section 46 generates a hierarchical reference picture 18 by using a reference frame picture 5 extracted from the frame memory 34.

In step 1202, the motion detection section 32 detects a 3-dimensional motion vector of a predetermined area (a macro-block) to be encoded, by referring to the hierarchical reference picture 18 from the hierarchical reference picture generation section 46.

In step 1203, the motion compensation section 33 generates a predicted picture signal 6 based on the 3-dimensional motion vector from the motion detection section 32 and the hierarchical reference picture 18 from the hierarchical reference picture generation section 46.

According to the present embodiment, if noise is superimposed on the reference frame picture 5, efficient encoding is expected by referring to a layer picture of adaptive low space resolution.

Additionally, the layer picture (e.g., layer 2 or 3) of low space resolution is characterized in that space resolution of the 3-dimensional motion vector is reduced, and in that redundancy during encoding of the 3-dimensional motion vector is avoided.

Furthermore, according to the present embodiment, the 3-dimensional vector is employed. A vector distribution on parameter space of the 3-dimensional motion vector is expected to be continuous spatially, and efficiency improvement of encoding can be expected.

The method of generating the predicted picture signal or the motion compensation value according to the present embodiment is only an example. It is possible to use an optional generation method necessary for realizing the switching of a calculation method of a motion compensation value executed in the present embodiment.

Operations/Effects of the Moving Picture Encoding and Decoding Devices According to the Embodiment 3

According to the moving picture encoding device according to the present invention, since the motion detection section 32 generates a 3-dimensional motion vector in accordance with the hierarchical reference picture 17, it is possible to carry out motion compensation of pixel accuracy different from one predetermined area to be encoded to another.

MODIFIED EXAMPLE 3A

Figure 25:
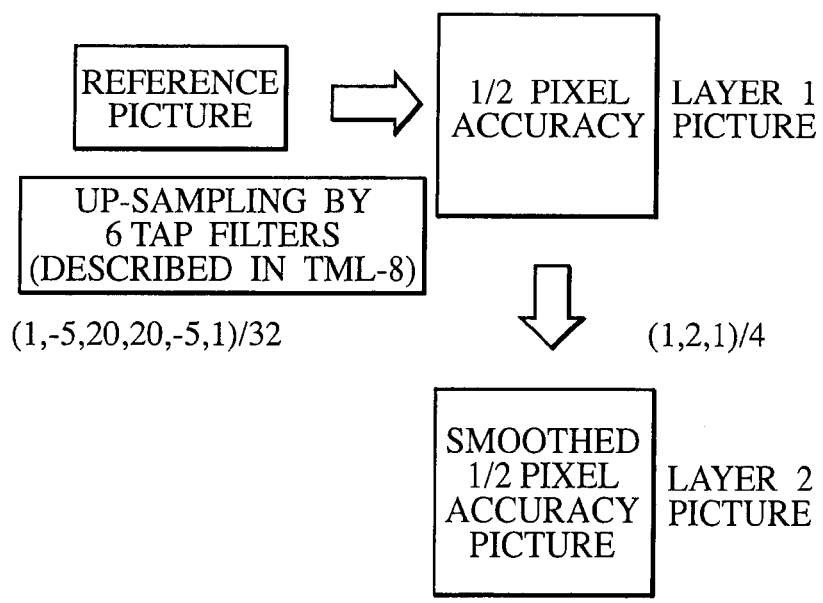
FIG. 25 is a diagram explaining a method for generating hierarchical reference pictures according to a modified example of the present invention.

The Modified Example 3A of the foregoing Embodiment 3 will be described. Hereinafter, differences between the modified example and the Embodiment 3 will be described by referring to FIG. 25.

First, the modified example is different from the foregoing Embodiment 3 in that motion compensation is executed not by ¼ pixel accuracy, but by ½ pixel accuracy.

That is, according to the modified example, each of the hierarchical reference picture generation section 46 and 81 executes up-sampling by applying 6 tap filters (1, −5, 20, 20, −5, 1)/32" used in the conventional "TML-8" to the reference frame picture 5, so as to generate a layer 1 of ½ pixel accuracy.

Second, the modified example is different from the foregoing Embodiment 3 in that each of the hierarchical reference picture generation section 46 and 81 independently applies a smoothing filter "(1, 2, 1)/4" to the layer 1 horizontally/vertically, so as to generate a layer 2.

Third, the modified example is different from the foregoing Embodiment 3 in that the number of layers is 2 (layer 1 and layer 2), and in that both has the same space resolution.

Thus, the followings are realized:

Pixel position of layer 1: MVx, MVy (a unit is ½ pixel)
Pixel position of layer 2: MVx, MVy (a unit is ½ pixel)

By adding the aforementioned changes and executing "intermediate value prediction" based on the same method as that of the conventional technology, the 3-dimensional motion vector of (LayerD, MVDx, MVDy) is encoded. "Adaptive arithmetic encoding" is different from that of the foregoing Embodiment 3 in that a context of PlayerE takes two states.

By the aforementioned changes, while motion compensation is executed by ½ pixel accuracy, if noise is superimposed on the reference frame picture 5, it is possible to carry out the motion compensation by switching to adaptive low resolution.

Especially, in low rate encoding, it is assumed that ¼ pixel accuracy is unnecessary, and rather there is a tendency to use a smoothed picture of motion compensation of ¼ pixel accuracy. Thus, here, a system of switching to an picture of explicitly low space resolution is described as the modified example.

Incidentally, according to the modified example, the filter "(1, 2, 1)/4" for generating the layer 2 picture is a simple low pass type filter. However, a smoothing filter of an edge holding type may be used.

For example, among smoothing filters of the edge holding type are a "median filter" for obtaining an intermediate value of an area of 3 pixels×3 pixels, and a "dynamic weighting filter" described in U.S. Pat. No. 6,041,145 "Device and method for smoothing picture signal, device and method for encoding picture and device and method for decoding picture" can be used.

The aforementioned "dynamic weighting filter" is what executes adaptive smoothing by calculating a difference absolute value between a smoothed center pixel value and its neighboring pixel value, and by providing a filter coefficient inversely proportional to the difference absolute value to a peripheral pixel value (near 8).

Incidentally, a program for causing a computer 100 to function as the moving picture encoding device 20 or the moving picture decoding device 50 of the present invention can be stored in a computer readable recording medium.

Figure 26:
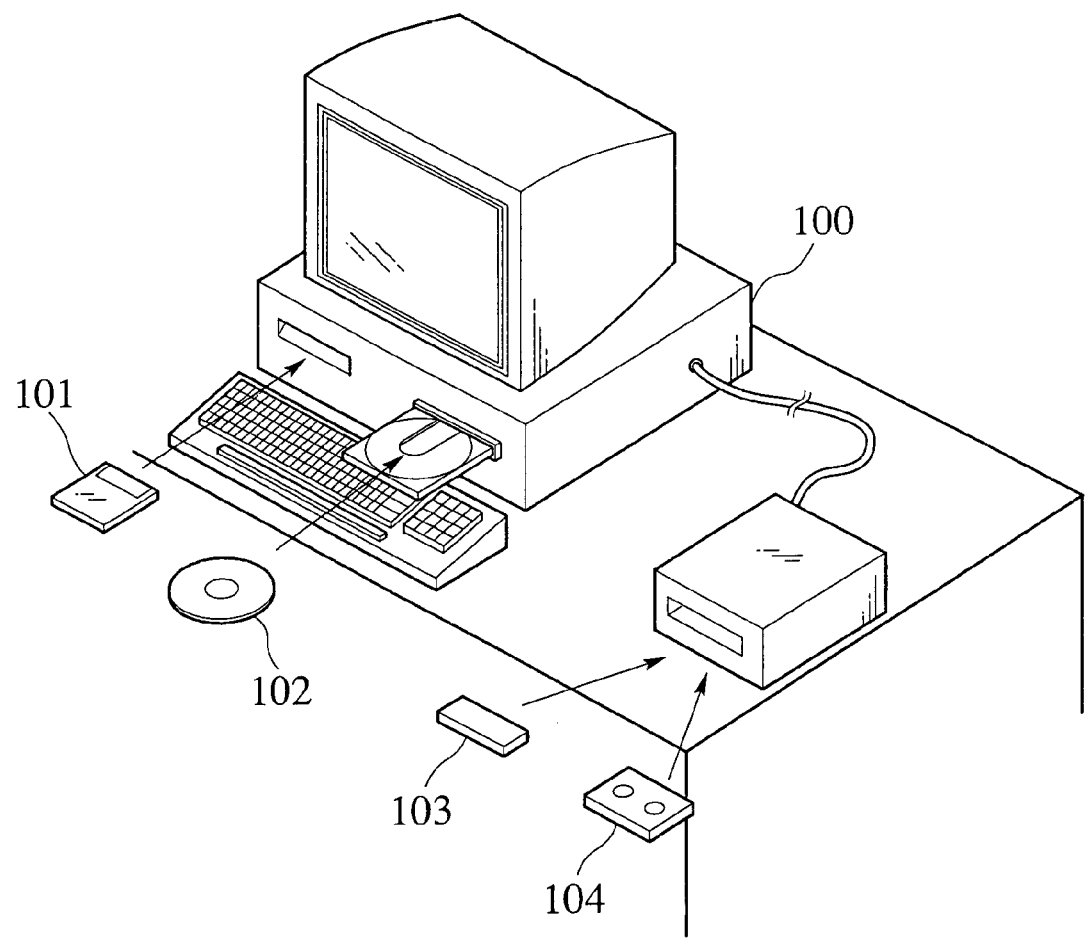
FIG. 26 is a diagram showing a computer readable recording medium which stores a program for causing a computer to function as the moving picture encoding device or the moving picture decoding device of the embodiment of the invention.

As the computer readable recording medium, as shown in FIG. 26, for example, a floppy disk 101, a compact disk 102, an IC chip 103, a cassette tape 104 or the like can be listed. According to such a computer readable recording medium which stores the program, the aforementioned program can be easily saved, transported, sold or the like.

INDUSTRIAL APPLICABILITY

As described above, according to the present invention, it is possible to express a predicted picture signal with light overheads, and to provide motion compensation of different pixel accuracy.

The invention claimed is:

1. A moving picture encoding device for encoding a moving picture constituted of a time sequence of frame pictures by motion compensation, the device comprising:
a reference picture generation section configured to generate a plurality of different reference pictures, by executing a plurality of different picture processing on a single reference frame picture, in accordance with an encoding condition of a predetermined area to be encoded, wherein the reference picture generation section is configured to generate, from the single reference frame picture, a first reference picture that has no funny position, and a second reference picture, from the single reference frame, that is more strongly smoothed than the first reference picture; and
a motion compensation section configured to calculate a motion compensation value for the predetermined area to be encoded, by using a generated reference picture subjected to the predetermined picture processing,
wherein the moving picture encoding device implements an image processing using the plurality of different reference pictures,
the motion compensation section determines a motion compensation value of the first reference picture that is equal to a motion compensation value in each pixel position of an integer pixel position, a ½ pixel position and a ¼ pixel position of a block defined in TML-8, except that an original motion compensation value is used for a motion compensation value in a same position as the funny position of the block defined in TML-8, and
the motion compensation section uses the second reference picture to calculate the motion compensation value only when distortion is suppressed more than when using the first reference picture.

2. The moving picture encoding device according to claim 1, wherein the reference picture generation section is configured to generate a reference picture in accordance with a prediction mode.

3. The moving picture encoding device according to claim 1, wherein the reference picture generation section is configured to generate a reference picture in accordance with a quantization processing.

4. A moving picture decoding device for decoding a moving picture constituted of a time sequence of frame pictures by motion compensation, the device comprising:
a reference picture generation section configured to generate a plurality of reference pictures from a single reference frame picture, in accordance with an encoding condition of a predetermined area to be decoded, wherein the reference picture generation section is configured to generate, from the single reference frame picture, a first reference picture that has no funny position, and a second reference picture, from the single reference frame, that is more strongly smoothed than the first reference picture; and
a motion compensation section configured to calculate a motion compensation value for the predetermined area to be decoded, by using a generated reference picture subjected to the predetermined picture processing,
wherein the moving picture decoding device implements an image processing using the plurality of different reference pictures,
the motion compensation section determines a motion compensation value of the first reference picture that is equal to a motion compensation value in each pixel position of an integer pixel position, a ½ pixel position and a ¼ pixel position of a block defined in TML-8, except that an original motion compensation value is used for a motion compensation value in a same position as the funny position of the block defined in TML-8, and
the motion compensation section uses the second reference picture to calculate the motion compensation value only when distortion is suppressed more than when using the first reference picture.

5. The moving picture decoding device according to claim 4, wherein the reference picture generation section is configured to generate a reference picture in accordance with a prediction mode.

6. The moving picture decoding device according to claim 4, wherein the reference picture generation section is configured to generate a reference picture in accordance with a quantization processing.

7. A moving picture encoding method for encoding a moving picture constituted of a time sequence of frame pictures by motion compensation, the method comprising:
generating a plurality reference pictures from a single reference frame picture, in accordance with an encoding condition of a predetermined area to be encoded, wherein the generating includes generating, from the single reference frame picture, a first reference picture that has no funny position, and a second reference picture, from the single reference frame, that is more strongly smoothed than the first reference picture;

calculating a motion compensation value for the predetermined area to be encoded, by using a generated reference picture subjected to the predetermined picture processing, wherein the calculating includes determining a motion compensation value of the first reference picture that is equal to a motion compensation value in each pixel position of an integer pixel position, a ½ pixel position and a ¼ pixel position of a block defined in TML-8, except that an original motion compensation value is used for a motion compensation value in a same position as the funny position of the block defined in TML-8, and the calculating uses the second reference picture to calculate the motion compensation value only when distortion is suppressed more than when using the first reference picture; and implementing an image processing using the plurality of different reference pictures.

8. The moving picture encoding method according to claim 7, wherein, in the generating, a reference picture is generated in accordance with a prediction mode.

9. The moving picture encoding method according to claim 7, wherein, in the generating, a reference picture is generated in accordance with a quantization processing.

10. A moving picture decoding method for decoding a moving picture constituted of a time sequence of frame pictures by motion compensation, the method comprising:

generating a plurality of reference pictures from a single reference frame picture, in accordance with an encoding condition of a predetermined area to be decoded, wherein the generating includes generating, from the single reference frame picture, a first reference picture that has no funny position, and a second reference picture, from the single reference frame, that is more strongly smoothed than the first reference picture;

calculating a motion compensation value for the predetermined area to be decoded, by using a generated reference picture subjected to the predetermined picture processing, wherein the calculating includes determining a motion compensation value of the first reference picture that is equal to a motion compensation value in each pixel position of an integer pixel position, a ½ pixel position and a ¼ pixel position of a block defined in TML-8, except that an original motion compensation value is used for a motion compensation value in a same position as the funny position of the block defined in TML-8, and the calculating uses the second reference picture to calculate the motion compensation value only when distortion is suppressed more than when using the first reference picture; and implementing an image processing using the plurality of different reference pictures.

11. The moving picture decoding method according to claim 10, wherein, in the generating, a reference picture is generated in accordance with a prediction mode.

12. The moving picture decoding method according to claim 10, wherein, in the generating, a reference picture is generated in accordance with a quantization process.

13. A non-transitory computer readable medium encoded with computer executable instructions for causing a computer to function as a moving picture encoding device for encoding a moving picture constituted of a time sequence of frame pictures by motion compensation, said computer executable instructions causing the computer to implement a method comprising:

generating a plurality of reference pictures from a single reference frame picture, in accordance with an encoding condition of a predetermined area to be encoded, wherein the generating includes generating, from the single reference frame picture, a first reference picture that has no funny position, and a second reference picture, from the single reference frame, that is more strongly smoothed than the first reference picture;

calculating a motion compensation value for the predetermined area to be encoded, by using a generated reference picture subjected to the predetermined picture processing, wherein the calculating includes determining a motion compensation value of the first reference picture that is equal to a motion compensation value in each pixel position of an integer pixel position, a ½ pixel position and a ¼ pixel position of a block defined in TML-8, except that an original motion compensation value is used for a motion compensation value in a same position as the funny position of the block defined in TML-8, and the calculating uses the second reference picture to calculate the motion compensation value only when distortion is suppressed more than when using the first reference picture; and implementing an image processing using the plurality of different reference pictures.

14. The non-transitory computer readable medium according to claim 13, wherein the generating includes generating a reference picture in accordance with a prediction mode.

15. The non-transitory computer readable medium according to claim 13, wherein the generating includes generating a reference picture in accordance with a quantization processing.

16. A non-transitory computer readable medium encoded with computer executable instructions for causing a computer to function as a moving picture decoding device for decoding a moving picture constituted of a time sequence of frame pictures by motion compensation, said computer readable instructions causing the computer to implement a method comprising:

generating a plurality of reference pictures from a single reference frame picture, in accordance with an encoding condition of a predetermined area to be decoded, wherein the generating includes generating, from the single reference frame picture, a first reference picture that has no funny position, and a second reference picture, from the single reference frame, that is more strongly smoothed than the first reference picture;

calculating a motion compensation value for the predetermined area to be decoded, by using a generated reference picture subjected to the predetermined picture processing, wherein the calculating includes determining a motion compensation value of the first reference picture that is equal to a motion compensation value in each pixel position of an integer pixel position, a ½ pixel position and a ¼ pixel position of a block defined in TML-8, except that an original motion compensation value is used for a motion compensation value in a same position as the funny position of the block defined in TML-8, and the calculating uses the second reference picture to calculate the motion compensation value only when distortion is suppressed more than when using the first reference picture; and implementing an image processing using the plurality of different reference pictures.

17. The non-transitory computer readable medium according to claim 16, wherein the generating includes generating a reference picture in accordance with a prediction mode.

18. The non-transitory computer readable medium according to claim 16, wherein the generating includes generating a reference picture in accordance with a quantization processing.

* * * * *